(12) United States Patent
Ishida

(10) Patent No.: US 10,387,542 B2
(45) Date of Patent: Aug. 20, 2019

(54) LAYOUT EDITING APPARATUS LAYOUT EDITING METHOD, AND STORAGE MEDIUM FOR BOOK-BINDING PRINTED SHEETS

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/651,718

(22) Filed: Jul. 17, 2017

(65) Prior Publication Data

US 2018/0032481 A1 Feb. 1, 2018

(30) Foreign Application Priority Data

Jul. 29, 2016 (JP) .................................. 2016-149938

(51) Int. Cl.
| | |
|---|---|
| *G06F 17/22* | (2006.01) |
| *G06F 17/21* | (2006.01) |
| *B42C 19/00* | (2006.01) |
| *G06F 17/24* | (2006.01) |
| *G06F 3/0481* | (2013.01) |
| *G06F 3/0485* | (2013.01) |
| *B42C 9/00* | (2006.01) |
| *B42D 1/08* | (2006.01) |
| *G06F 3/0482* | (2013.01) |

(52) U.S. Cl.
CPC ............ *G06F 17/212* (2013.01); *B42C 19/00* (2013.01); *G06F 3/0481* (2013.01); *G06F 3/0485* (2013.01); *G06F 17/217* (2013.01); *G06F 17/2294* (2013.01); *G06F 17/24* (2013.01); *B42C 9/00* (2013.01); *B42D 1/08* (2013.01); *G06F 3/0482* (2013.01)

(58) Field of Classification Search
CPC .. G06F 17/2294; G06F 17/217; G06F 17/212; G06F 3/0485; G06F 17/24; G06F 3/0481; G06F 3/0482; B42C 9/00; B42C 19/00; B42D 1/08
See application file for complete search history.

(56) References Cited

U.S. PATENT DOCUMENTS

| | | | |
|---|---|---|---|
| 6,898,389 B2 * | 5/2005 | Osada ................ | G03G 15/5016 399/81 |
| 7,460,253 B2 * | 12/2008 | Osada ................ | H04N 1/00973 358/1.13 |

(Continued)

FOREIGN PATENT DOCUMENTS

JP           5371560 B2    12/2013

*Primary Examiner* — Maikhanh Nguyen
(74) *Attorney, Agent, or Firm* — Canon U.S.A., Inc. IP Division

(57) ABSTRACT

A layout editing apparatus capable of editing a layout of a plurality of sheets in a layout editing area displayed on a display unit in a case where the plurality of sheets is to be book-bound after being printed includes a determination unit and a layout unit. The determination unit determines, in the layout editing area, a layout-inhibited area where a layout of an object is inhibited, at a position corresponding to a portion at which the plurality of printed sheets is to be bound, with a size according to information about book-binding. The layout unit lays out the object so as not to overlap with the layout-inhibited area determined by the determination unit.

20 Claims, 18 Drawing Sheets

(56) References Cited

U.S. PATENT DOCUMENTS

| | | | | |
|---|---|---|---|---|
| 8,564,826 | B2* | 10/2013 | Morooka | G06F 17/211 |
| | | | | 358/1.18 |
| 2003/0214666 | A1* | 11/2003 | Osada | H04N 1/00973 |
| | | | | 358/1.13 |
| 2004/0163047 | A1* | 8/2004 | Nagahara | G06F 17/211 |
| | | | | 715/246 |
| 2004/0263907 | A1* | 12/2004 | Hiraki | G06F 17/217 |
| | | | | 358/1.18 |
| 2007/0094598 | A1* | 4/2007 | Nakai | H04N 1/00416 |
| | | | | 715/703 |
| 2009/0077489 | A1* | 3/2009 | Homma | G06F 3/0481 |
| | | | | 715/788 |
| 2009/0290169 | A1* | 11/2009 | Kobashi | B42C 19/04 |
| | | | | 358/1.2 |
| 2010/0328692 | A1* | 12/2010 | Morooka | G06F 17/211 |
| | | | | 358/1.9 |

\* cited by examiner

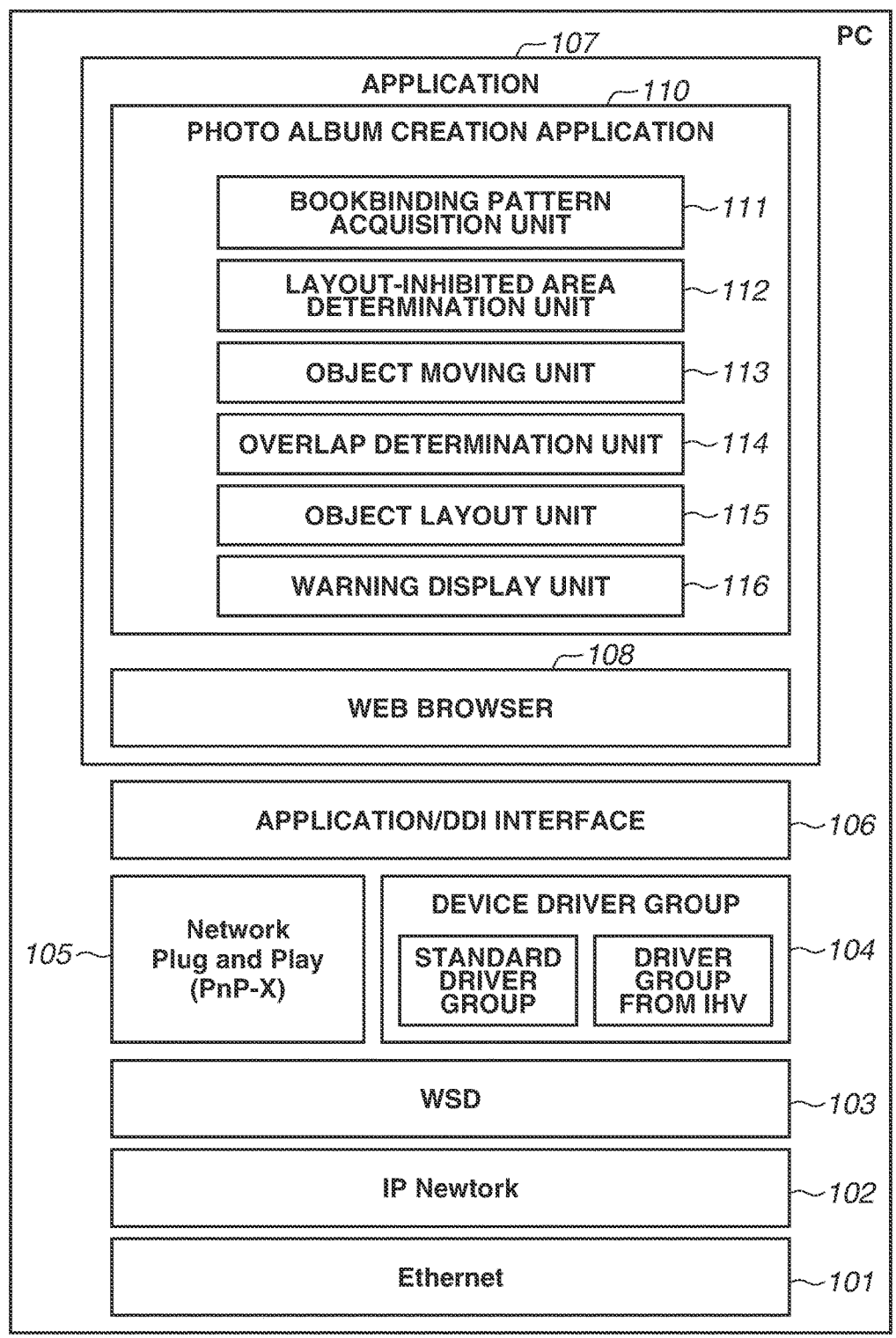

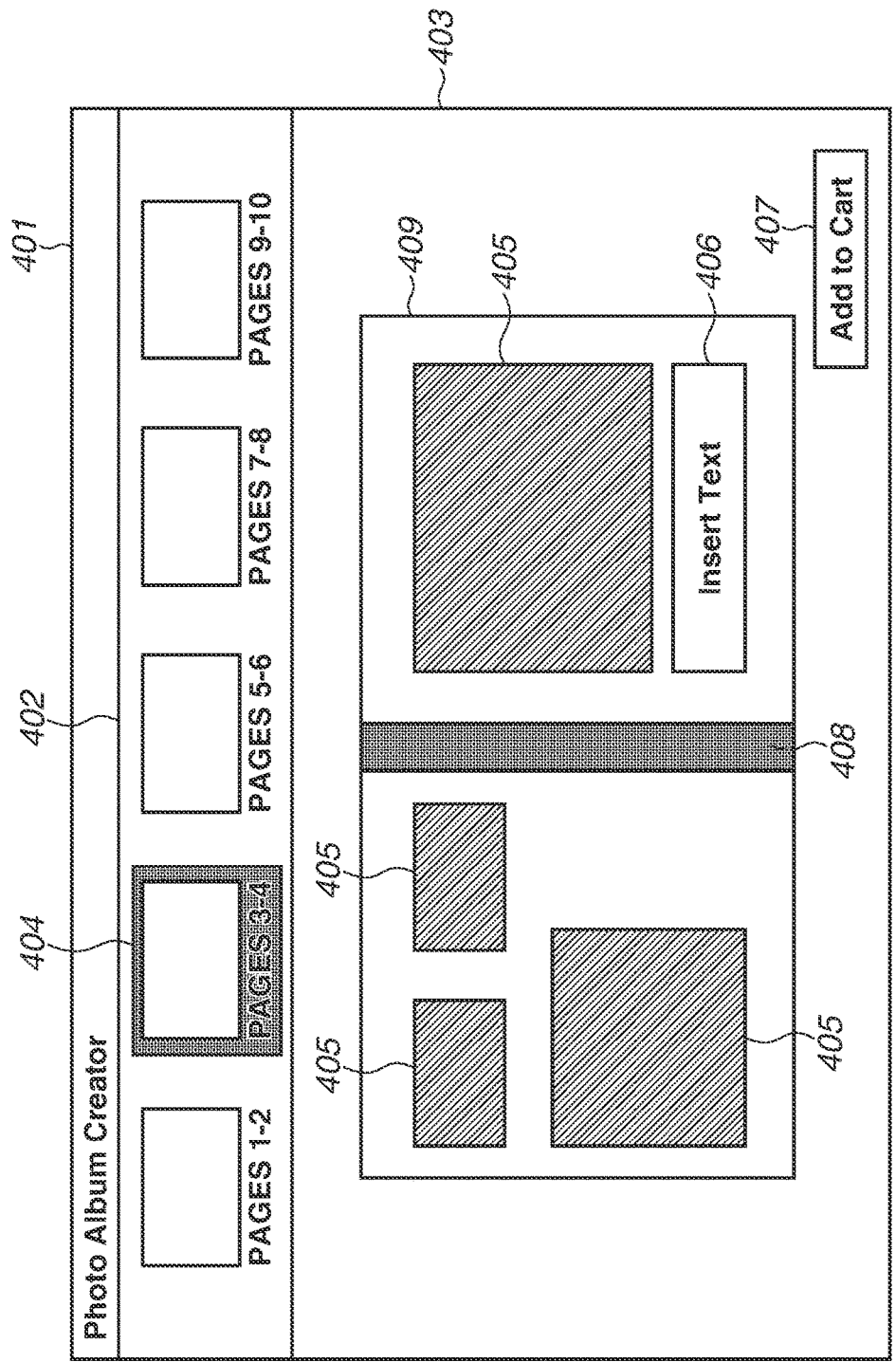

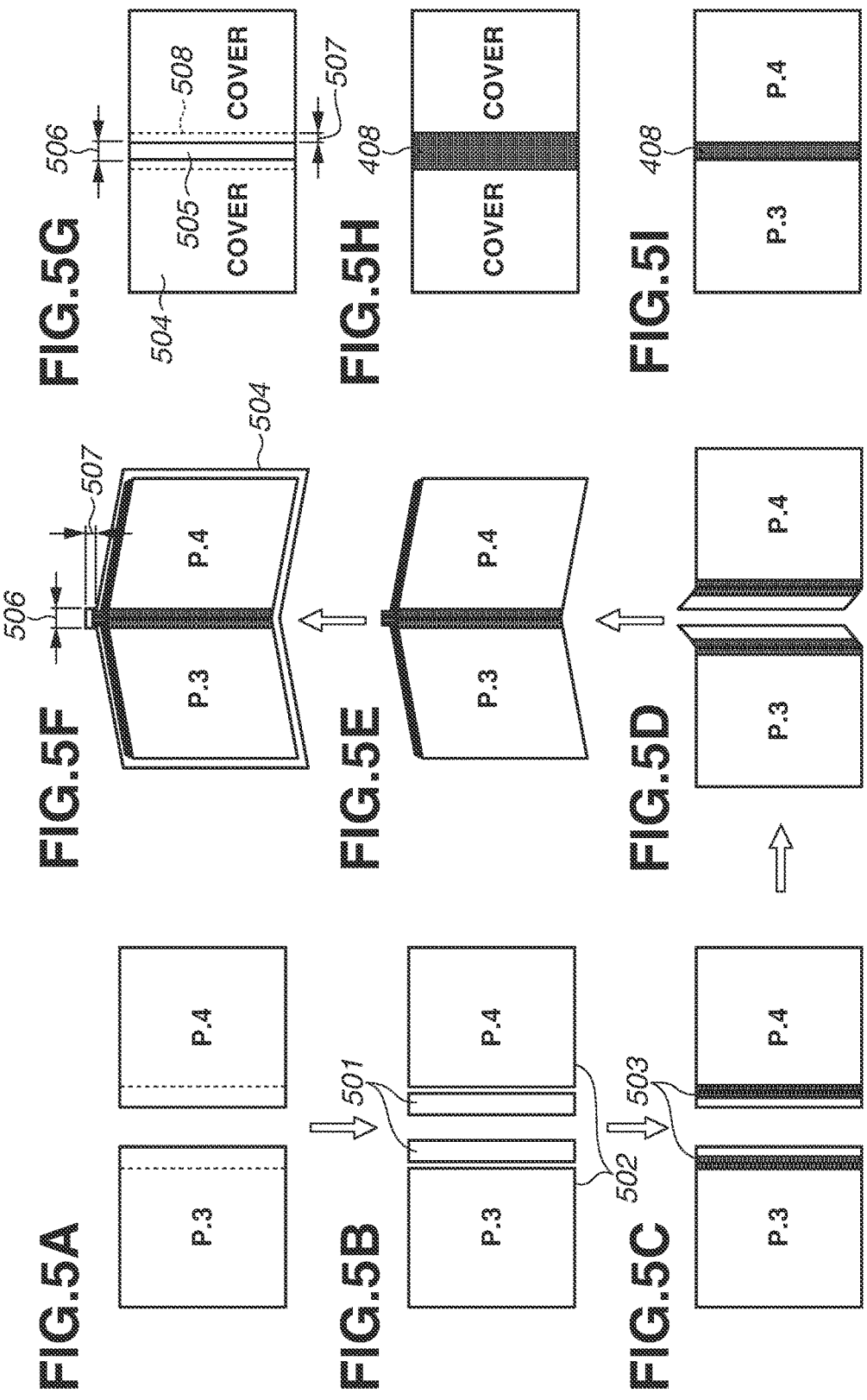

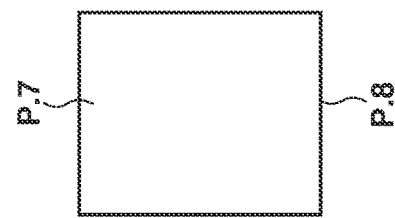
FIG.6A
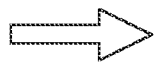
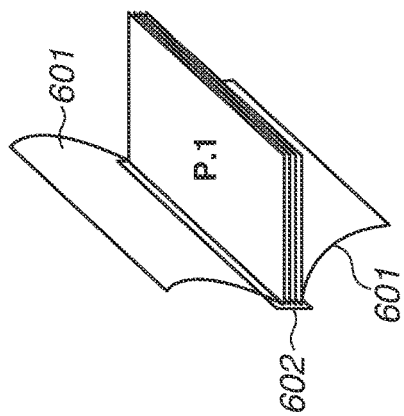
FIG.6B

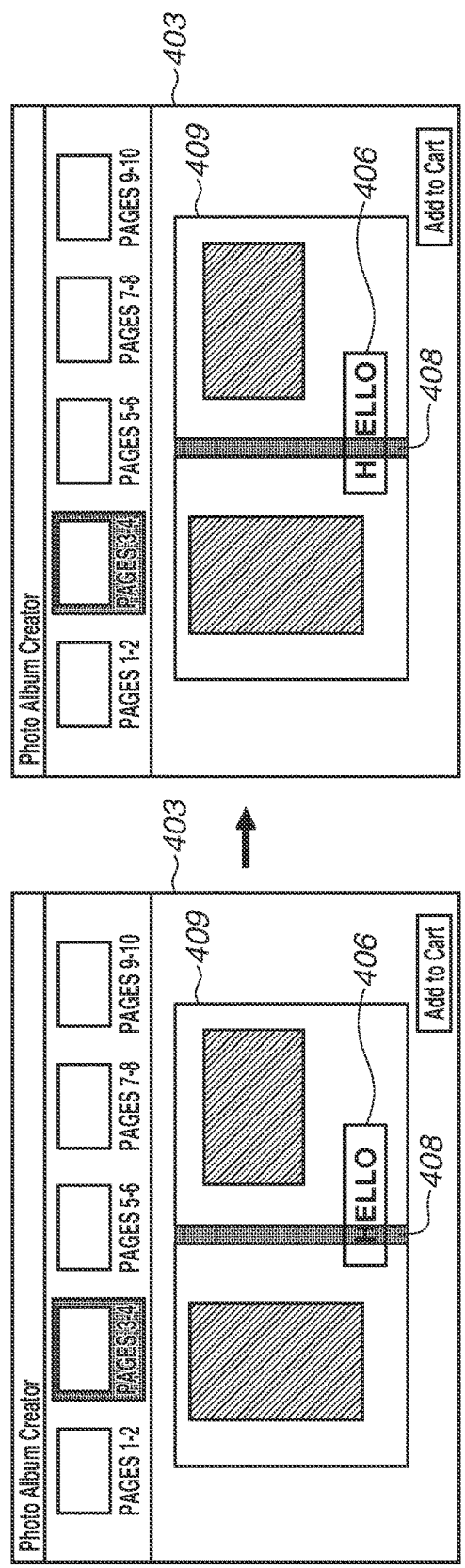

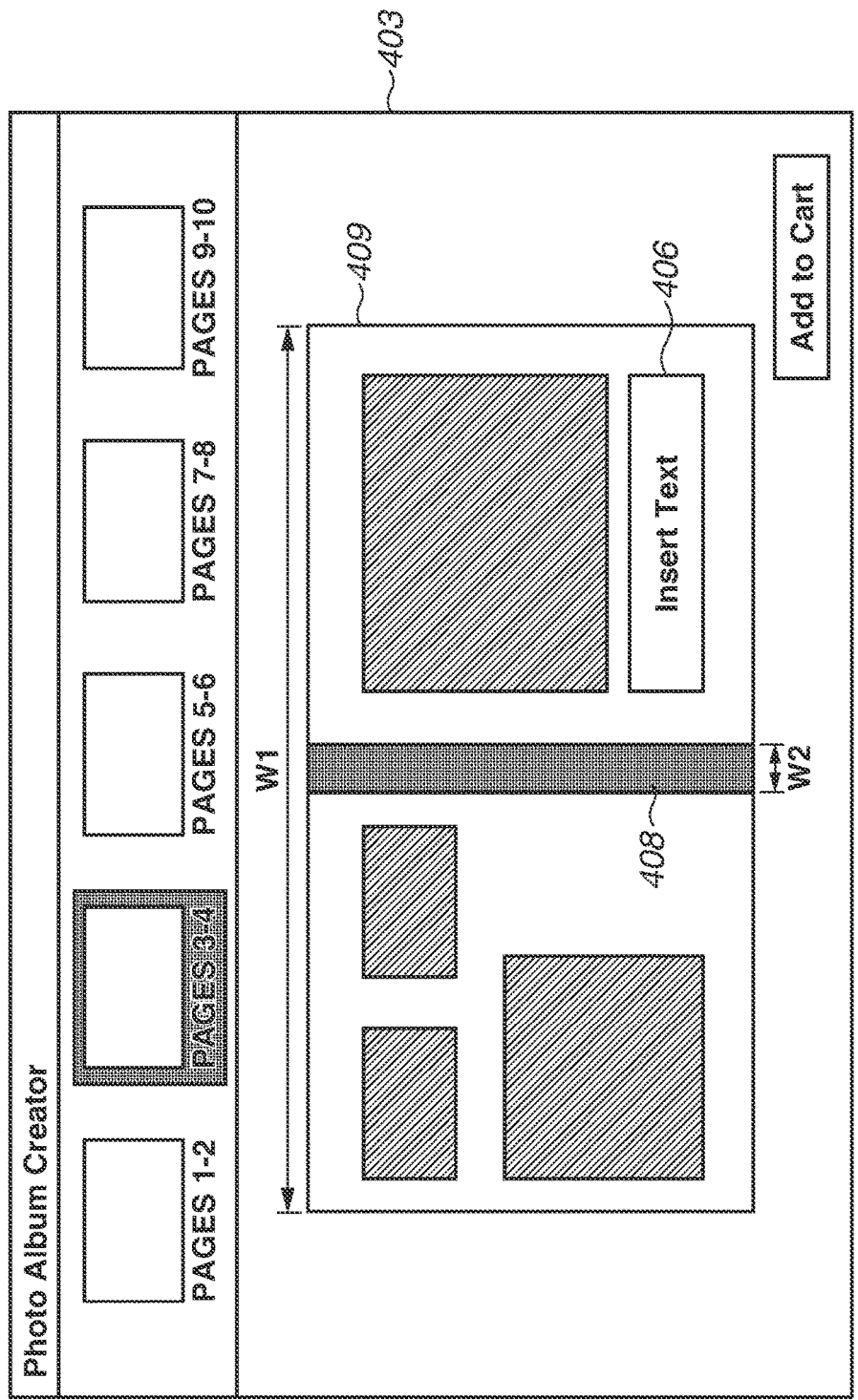

LAYOUT EDITING APPARATUS LAYOUT EDITING METHOD, AND STORAGE MEDIUM FOR BOOK-BINDING PRINTED SHEETS

BACKGROUND OF THE INVENTION

Field of the Invention

The disclosed information relates to a layout editing apparatus capable of editing a layout of printed sheets to be bound, a layout editing method, and a storage medium.

Description of the Related Art

Systems for supporting layout editing of printed sheets to be bound are known. As one of such systems, a photo album creation/ordering system has been put into practical use. In the photo album creation/ordering system, a user can edit a layout on a screen displayed on the display of an information processing apparatus, such as a personal computer (PC), by using a pointing device such as a mouse. For example, the user can perform layout editing, such as exchanging, laying out, enlarging/reducing, and trimming image objects, and inputting a text in a text box, and laying out and enlarging/reducing the text box. Edited data in which layout editing has been completed is uploaded to a server of a provider, and printed sheets are output by the image forming apparatus of the provider. The output printed sheets are bound into a photo album having a booklet format by the image forming apparatus or by hand.

In some cases, the photo album creation/ordering system is requested to perform layout editing so that an object is not laid out across continuous pages. This is because the photo album creation/ordering system performs layout editing on a spread page basis. For example, if a text object is laid out across spread pages, the text may be printed on a fold between spread pages in a photo album after binding.

Japanese Patent No. 5371560 discusses a layout editing method for laying out an object at a suitable position so as not to overlap with continuous pages in consideration of a boundary between continuous pages.

Like the layout editing method discussed in Japanese Patent No. 5371560, when an object is laid out so as not to overlap with the boundary between continuous pages, the object may be laid out near the page boundary.

For example, suppose that a text is laid out near the boundary between spread pages for bookbinding (for example, including two pages) so as not to overlap with the boundary between two pages, and then printing and bookbinding are performed. Even in this case, the text may become hard to see depending on a booklet binding method and the number of pages.

SUMMARY OF THE INVENTION

There is provided a layout editing method for making it possible to print photographs and texts at legible positions in spread pages of a book-bound booklet. The disclosed information is directed to providing a layout editing method for laying out objects so that an object is not laid out at a position corresponding to a portion at which a plurality of printed sheets is to be bound and is laid out at a suitable position.

According to an aspect of the present invention, a layout editing apparatus capable of editing a layout of a plurality of sheets in a layout editing area displayed on a display unit in a case where the plurality of sheets is to be book-bound after being printed includes a determination unit configured to determine, in the layout editing area, a layout-inhibited area where a layout of an object is inhibited, at a position corresponding to a portion at which the plurality of printed sheets is to be bound, with a size according to information about bookbinding, and a layout unit configured to lay out the object so as not to overlap with the layout-inhibited area determined by the determination unit.

Further features of the present invention will become apparent from the following description of embodiments with reference to the attached drawings.

BRIEF DESCRIPTION OF THE DRAWINGS

FIG. 3 illustrates an example of a software configuration of the PC according to the first embodiment.

FIG. 4 illustrates an example of a layout editing screen according to the first embodiment.

FIGS. 5A, 5B, 5C, 5D, 5E, 5F, 5G, 5H, and 5I illustrate a full flat type bookbinding method according to the first embodiment.

FIGS. 6A and 6B illustrate a standard type bookbinding method according to the first embodiment.

FIGS. 13A and 13B illustrate a second modification of the second embodiment.

FIG. 14 illustrates a maximum width which can be taken by an object according to a third embodiment.

DESCRIPTION OF THE EMBODIMENTS

Embodiments will be described in detail below with reference to the accompanying drawings. The following embodiments do not limit the scope of the present invention. Not all of the combinations of the features described in the embodiments are indispensable to the solutions for the present invention.

The following embodiments will be described focusing on a layout editing method for laying out objects so that an object is not laid out at a position corresponding to a portion at which a plurality of printed sheets is to be bound and is laid out at a suitable position.

For example, in a booklet book-bound by "perfect binding" for binding printed sheets by using an adhesive, the adhesive permeates each printed sheet, and therefore a swell occurs near a fold between spread pages when the booklet is spread. Therefore, if objects are laid out without taking into consideration a booklet binding method and the number of pages, a photograph or a text is printed near the fold between spread pages, causing the photograph or the text to be seen with difficulty.

The following embodiments will be described focusing on a technique for preventing objects from being laid out in a state where a photograph or a text becomes hard to be seen after printed sheets are bound.

Figure 1:
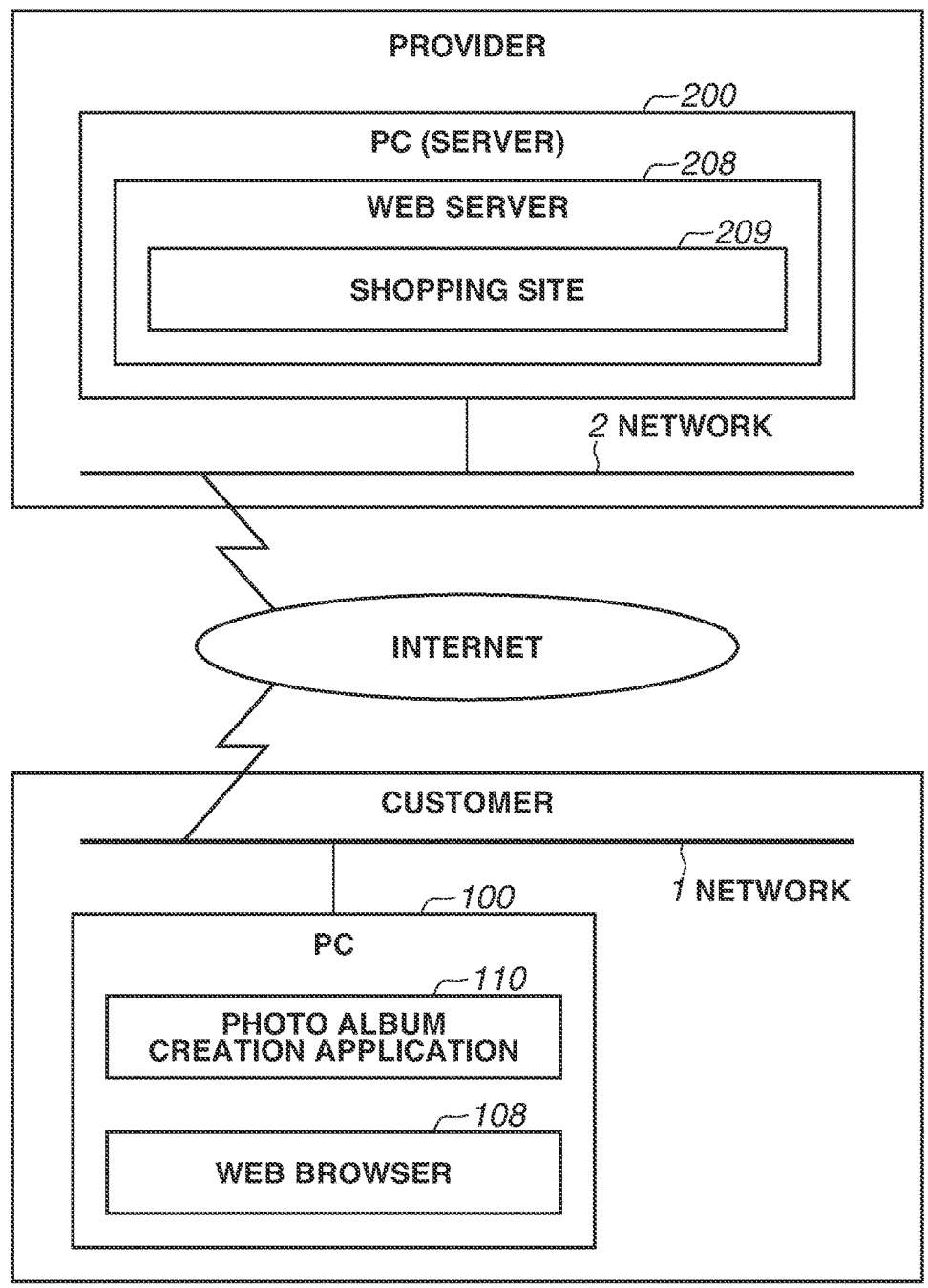
FIG. 1 schematically illustrates an overall configuration of a photo album creation/ordering system according to a first embodiment.

FIG. 1 illustrates an overall configuration of a photo album creation/ordering system according to a first embodiment. Referring to FIG. 1, each of information processing apparatuses 100 and 200 is composed of an ordinary personal computer (hereinafter sometimes referred to as a PC). Each of the PCs 100 and 200 has a hardware configuration illustrated in FIG. 2. As an operating system (OS), an OS equivalent to Windows8® or Windows Server 2012® is installed in the PCs 100 and 200. The PCs 100 and 200 are connected to networks 1 and 2 based on Ethernet®, respectively.

A photo album creation application 110 (hereinafter referred to as an "application 110") is composed of an executable file (*.EXE). When the photo album creation application 110 is built into the information processing apparatus 100, the information processing apparatus 100 functions as a layout editing apparatus capable of editing a layout of printed sheets to be bound. A web browser 108 is used to browse World Wide Webs (WWW). The network 1 is a home network built in a housing of a user (such as a customer) using the PC 100. The network 2 is an office network of a provider. The PC 200 connected to the network 2 includes a web server 208 and offers the provider's website via the Internet. A shopping site 209 is a shopping site where the provider provides services for users. The user can order a photo album by using the shopping site 209.

Figure 2:
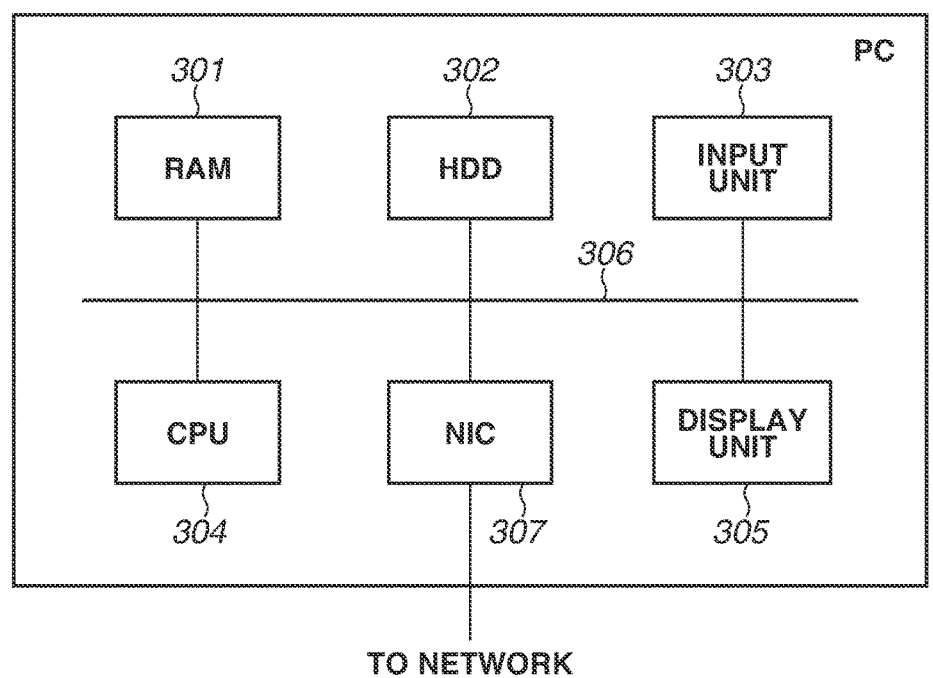
FIG. 2 illustrates an example of a hardware configuration of a personal computer (PC) according to the first embodiment.

FIG. 2 illustrates an example of a hardware configuration of a PC according to the present embodiment. The PCs 100 and 200 are respectively composed of the hardware configuration illustrated in FIG. 2. As illustrated in FIG. 2, the PCs 100 and 200 each includes a random access memory (RAM) 301, a hard disk drive (HDD) 302, an input unit 303 having an input function such as a keyboard and a mouse, and a central processing unit (CPU) 304 for controlling the entire PC. Each of the PCs 100 and 200 further includes a display unit 305 such as a liquid crystal display (LCD) display, and a network interface card (NIC) 307 as a network interface. The PCs 100 and 200 each includes a bus 306 for connecting these blocks to allow communication with each other. Although the HDD 302 functions as a storage area for the respective PCs 100 and 200 according to the present embodiment, the HDD 302 may be a storage area using various drives for storing and reading data to/from a mobile storage medium such as a compact disc read only memory (CD-ROM), or using a flash memory. Applications such as the application 110 and the web browser 108, and software modules illustrated in FIG. 3 are implemented when the CPU 304 reads into the RAM 301 a program code stored in the HDD 302 and then executes the program code. Thus, the CPU 304 is able to implement the functions of applications such as the application 110 and the web browser 108, and the software modules illustrated in FIG. 3.

FIG. 3 illustrates an example of a configuration of a software module mounted on a PC according to the embodiment. As illustrated in FIG. 3, the software module mounted on the PC includes an Ethernet control stack 101, an Internet Protocol (IP) network control stack 102, and a Web Service on Device (WSD) control stack 103. The Ethernet control stack 101 controls Ethernet. The IP network control stack 102 controls an IP network. The WSD control stack 103 controls a WSD for offering a mechanism for searching for a device on the network.

The software module mounted on the PC further includes a Plug and Play Extensions (PnP-X) control stack 105, a device driver group 104, and an Application/Device Driver Interface (DDI) interface 106. The PnP-X control stack 105 controls network plug and play. The PnP-X is an extended function of plug and play which offers supports on network connection devices. PnP-X is an abbreviation for Plug and Play Extensions, a function preinstalled in Windows8 OS. The device driver group 104 includes a standard driver group standardly supplied to the OS and an IHV (Independent Hardware Vender) driver group offered from IHV. The Application/DDI interface 106 includes an Application Programming Interface (API) and a Device Driver Interface (DDI).

The software module mounted on the PC includes an application software group 107. The application software group 107 includes the photo album creation application 110 and the web browser 108.

The photo album creation application 110 includes a bookbinding pattern acquisition unit 111, a layout-inhibited area determination unit 112, an object moving unit 113, an overlap determination unit 114, an object layout unit 115, and a warning display unit 116. The bookbinding pattern acquisition unit 111 acquires a bookbinding pattern which is information about bookbinding of a photo album. The layout-inhibited area determination unit 112 determines a layout-inhibited area in a layout editing area based on the bookbinding pattern acquired by the bookbinding pattern acquisition unit 111. The object moving unit 113 moves an object to a desired position in the layout editing area according to a user instruction input via the input unit 303. The overlap determination unit 114 determines whether a destination position of an object overlaps with the layout-inhibited area. The object layout unit 115 lays out an object at a predetermined position in the layout editing area according to the determination result of the overlap determination unit 114. The warning display unit 116 displays a warning message on the display unit 305 when the destination position of the object overlaps with the layout-inhibited area.

FIG. 4 illustrates an example of a layout editing screen displayed on the display unit 305 by the application 110 according to the present embodiment. A display area 401 in the layout editing screen includes a thumbnail display area 402 displaying a thumbnail of each page of the photo album, and a page display area 403 displaying spread pages of the photo album. In the thumbnail display area 402, when a thumbnail corresponding to a desired page is selected, the selected thumbnail is in a selected state 404. In an example of a screen illustrated in FIG. 4, the thumbnail corresponding to pages 3-4 of the photo album is in the selected state 404. Pages 3-4 in the selected state 404 are displayed in the page display area 403 in a spread state.

The page display area 403 according to the present embodiment includes an "Add to Cart" button 407 and a layout editing area 409. The layout editing area 409 includes photo slots 405, a text box 406, and a layout-inhibited area 408. The layout editing area 409 is an area for displaying spread pages of the photo album to allow layout editing according to a user instruction input via the input unit 303. Each photo slot 405 is an area where an image (image object) such as a photograph is to be laid out. The text box 406 is an interface where a text can be input. The "Add to Cart" button 407 is used to add the edited photo album to the cart. When the "Add to Cart" button 407 is pressed, the edited photo album is listed on the shopping site 209 as an order target. The layout-inhibited area 408 is an area where the text box 406 cannot be laid out. The data of the photo album which has been edited in the layout editing screen (see FIG. 4) is uploaded from the PC 100 of the customer to the PC (server) 200 of the provider, and printed sheets corresponding to pages of the photo album are output by the image forming apparatus (not illustrated) of the provider. The output printed sheets are bound into a booklet-like photo album by the image forming apparatus (not illustrated) or by hand.

FIGS. 5A to 5I, 6A, and 6B illustrate a photo album binding method according to the present embodiment. FIGS. 5A to 5I illustrate in details a full flat type bookbinding method, and FIGS. 6A and 6B illustrate in details a standard type bookbinding method.

First of all, the full flat type bookbinding method will be described below with reference to FIGS. 5A to 5I. Referring to FIG. 5A, printed sheets corresponding to pages of the photo album are output. According to the present embodiment, pages 3 and 4 to be recorded in the photo album are printed. Referring to FIG. 5B, when each page is cut off into two pieces along a dotted line, pages 3 and 4 are cut off into rectangular-shaped areas 501 and separated areas 502. The rectangular-shaped areas 501 are required to paste the right and left spread pages. Referring to FIG. 5C, the rectangular-shaped areas 501 and the separated areas 502 are glued with adhesive tapes 503. Referring to FIG. 5D, the rectangular-shaped areas 501 and the separated areas 502 are folded at the portions glued with the adhesive tapes 503. The processes illustrated in FIGS. 5C and 5D are performed for all pages, all of the folded pages are bundled, and the rectangular-shaped areas 501 are bound with a stapler (see FIG. 5E). Referring to FIG. 5F, using an adhesive, a cover 504 is pasted on the bundle of the pages bound with a stapler to complete full flat type bookbinding.

As described above, since the full flat type bookbinding method once cuts off each page into two pieces and then glues them, a swell occurring near the fold of spread pages when a page is opened can be restrained to some extent.

To flatly open a page, creases are provided on dotted line portions 508 of the cover 504 so that the cover 504 is opened and closed along the dotted line portions 508 separated from a back cover 505 by a fixed width 507. If a text is printed on an area overlapping with a dotted line portion 508, the text printed on the cover 504 is folded and becomes hard to be seen when the cover 504 is opened and closed. Accordingly, when layout editing is performed, the layout-inhibited area 408 in the cover 504 has a width which equals the sum of a width 506 of the back cover 505 and the fixed widths 507 (see FIG. 5H). This width is larger than the width of the layout-inhibited area 408 set in the layout editing area 409 of spread pages, for example, pages 3-4 (see FIG. 5I).

The standard type bookbinding method will be described below with reference to FIGS. 6A and 6B. Referring to FIG. 6A, each page of a photo album is output. According to the present embodiment, pages 1 to 8 to be recorded in the photo album are output. Referring to FIG. 6B, when each of the output pages illustrated in FIG. 6A and a cover 601 are bound by using an adhesive 602, standard type bookbinding is completed. Since the standard type bookbinding method binds pages and the cover 601 by using an adhesive, the adhesive will permeate each page to some extent. Accordingly, the swell occurring near the fold of spread pages will become larger than the swell occurring with the full flat type bookbinding method.

Figure 7:
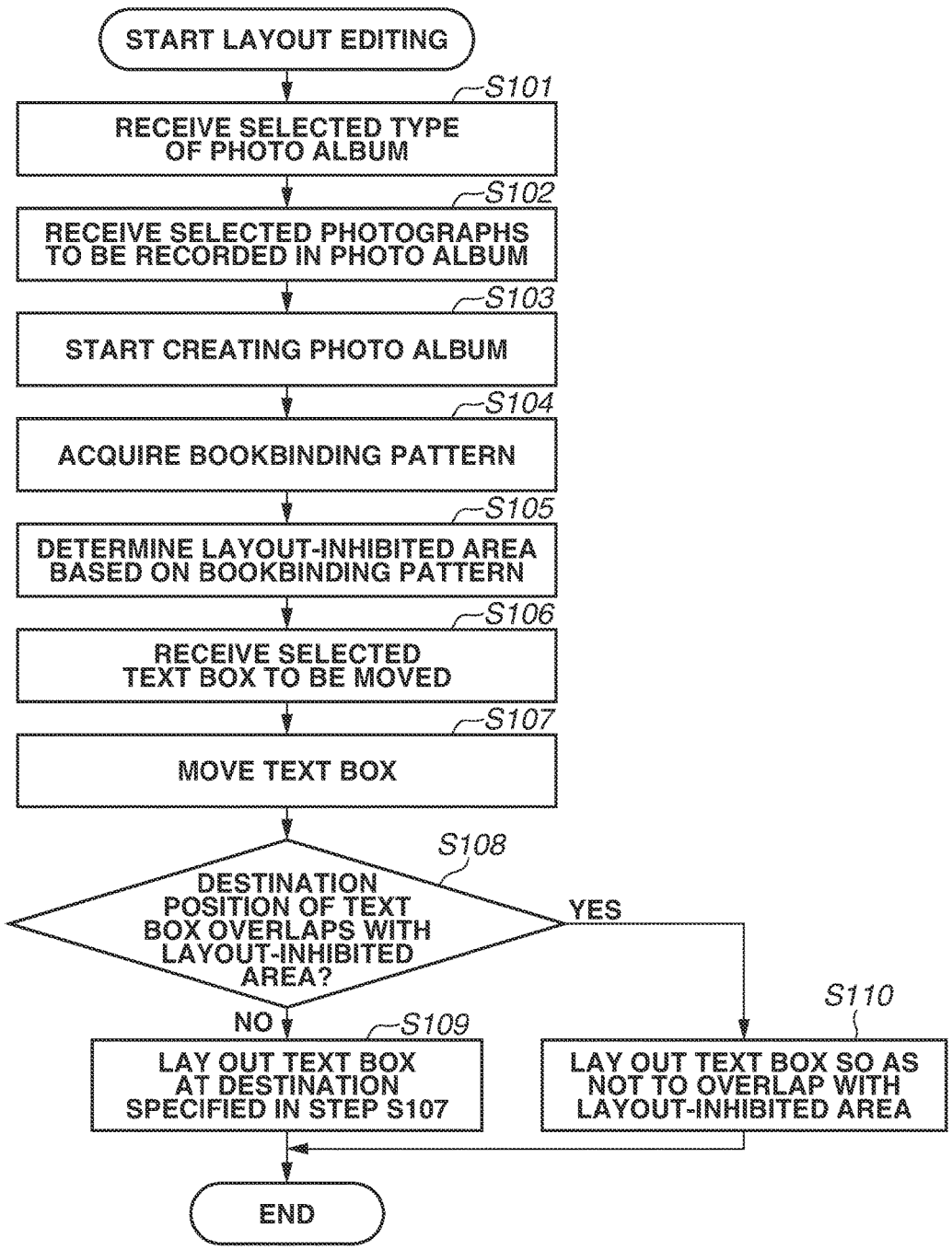
FIG. 7 is a flowchart illustrating a layout editing processing procedure according to the first embodiment.

FIG. 7 is a flowchart illustrating a layout editing processing procedure according to the present embodiment. Processing in the flowchart illustrated in FIG. 7 is implemented when the CPU 304 loads a program code stored in the storage area such as the HDD 302 and then executes the program code. Hereinafter, the leading letter S means a step in the flowchart.

In step S101, the input unit 303 receives a selected type of a photo album from the user. According to the present embodiment, the type of the photo album desired by the user is determined by receiving a selected photo album binding method, the number of printed sheets (number of pages of the photo album), a size of printed sheets, and a paper type of printed sheets.

In step S102, the input unit 303 receives selected photographs to be recorded in the photo album. For example, when a photograph is stored in a picture folder generated in the storage area such as the HDD 302, the selected photographs to be recorded in the photo album can be received after receiving a specification of a picture folder. The storage area where a picture folder is generated may be the HDD 302 of the PC 100 used by the user, the HDD 302 of the PC 200 on the server side, or other storage areas.

In step S103, the application 110 starts creating a photo album. According to the present embodiment, the application 110 generates a template for laying out photographs and lays out photographs in the generated template according to the type of the photo album selected in step S101 and the photographs selected in step S102. When a layout of the photographs on the generated template is determined, the layout editing screen (see FIG. 4) generated based on the template in which photographs are laid out is displayed on the display unit 305. The application 110 according to the present embodiment can receive from the user a correction operation for the template in which photographs are laid out via the input unit 303 while displaying the layout editing screen (see FIG. 4) on the display unit 305. Although, in the above-described embodiment, the application 110 generates a template and lays out photographs in step S103, the embodiment is not limited thereto. The user may manually perform an operation for generating a template and an operation for laying out photographs in the generated template.

In step S104, the bookbinding pattern acquisition unit 111 acquires a bookbinding pattern as information about bookbinding of the photo album. The information about bookbinding specifies a format in which the photo album is to be book-bound, that is, corresponds to the information of the selected photo album binding method, the number of printed sheets to be bound in the photo album, the size of printed sheets, and the paper type of printed sheets received in step S101. Although, in the present embodiment, the bookbinding pattern corresponding to the type of the photo album received from the user is acquired in S104, a predetermined bookbinding pattern may be read from the storage area such as the HDD 302.

In step S105, the layout-inhibited area determination unit 112 determines the layout-inhibited area 408 in the layout editing area 409 based on the bookbinding pattern acquired in step S104. The layout-inhibited area 408 according to the present embodiment refers to an area where a laid out photograph or text is hard to be seen when the photo album is actually bound (see FIG. 4).

As illustrated in FIG. 4, the layout-inhibited area 408 is determined at a position including the boundary between a plurality of pages in spread pages. In the processing in step S105, various layout-inhibited areas 408 with different widths are determined according to the bookbinding pattern acquired in step S104 out of a plurality of bookbinding patterns. The width of the layout-inhibited area 408 will be described below with reference to FIGS. 8A to 8D.

In step S106, the input unit 303 receives a selected text box to be moved.

In step S107, the object moving unit 113 moves the text box received in step S106 to an arbitrary position in the layout editing area 409. According to the present embodiment, when a template is determined in step S103, the position and the size of the layout editing area 409 text box are automatically determined since an initial position of a text box depends on the template. To move the text box from such automatically determined initial position to the arbitrary position in the layout editing area 409, the input unit 303 can receive a moving operation from the user.

In step S108, the overlap determination unit 114 determines whether a destination position of the text box overlaps with the layout-inhibited area 408. In a case where the overlap determination unit 114 determines that the destination position of the text box does not overlap with the layout-inhibited area 408 (NO in step S108), the processing proceeds to step S109. In step S109, the object layout unit 115 lays out the text box at the destination specified in step S107. On the other hand, in a case where the overlap determination unit 114 determines that the destination position of the text box overlaps with the layout-inhibited area 408 (YES in step S108), the processing proceeds to step S110. In step S110, the object layout unit 115 lays out the text box so as not to overlap with the layout-inhibited area 408. A specific method for laying out a text box in step S110 will be described below with reference to FIGS. 8A to 8D and subsequent drawings.

Although, in this flowchart, steps S104 and S105 are executed after step S103, these steps may be executed after step S101 and before step S108. Although, in the present embodiment, the overlap determination unit 114 determines whether the destination position of the text box overlaps with the layout-inhibited area 408, the overlap determination unit 114 may determine whether a text box added through a user operation overlaps with the layout-inhibited area 408 in another embodiment. Object types subjected to this determination may include not only a text box but also an image object such as a photograph and an illustration, and a graphics object such as a drawing.

Figure 8A:
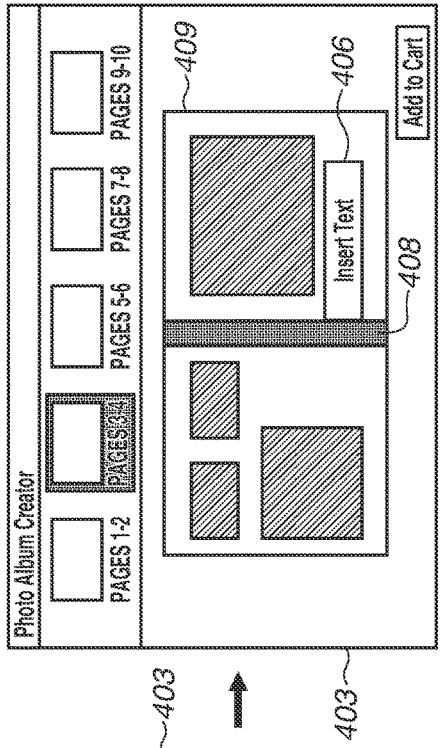
FIGS. 8A, 8B, 8C, and 8D illustrate a screen transition of the layout editing screen according to the first embodiment.
Figure 8B:
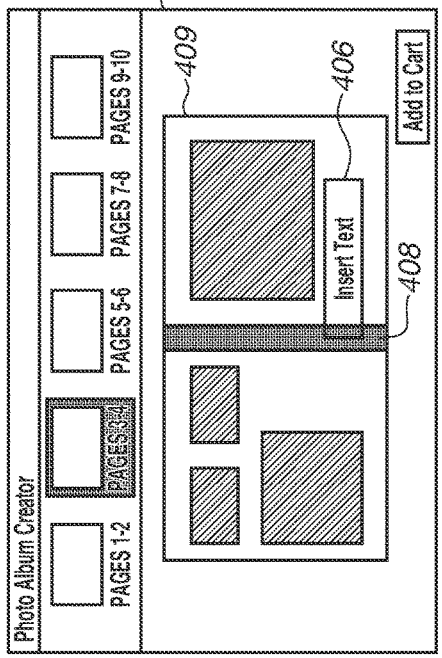
Figure 8C:
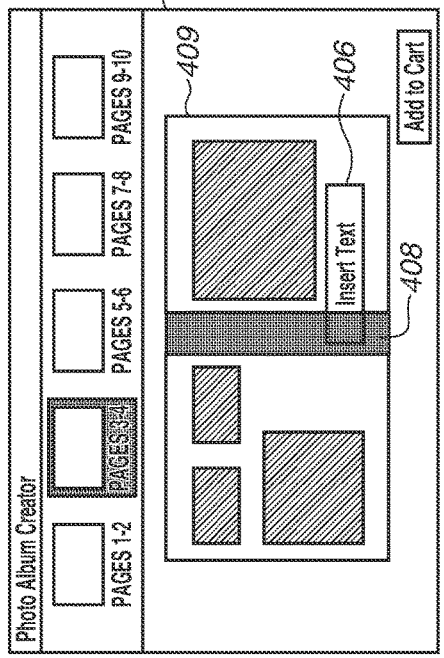
Figure 8D:
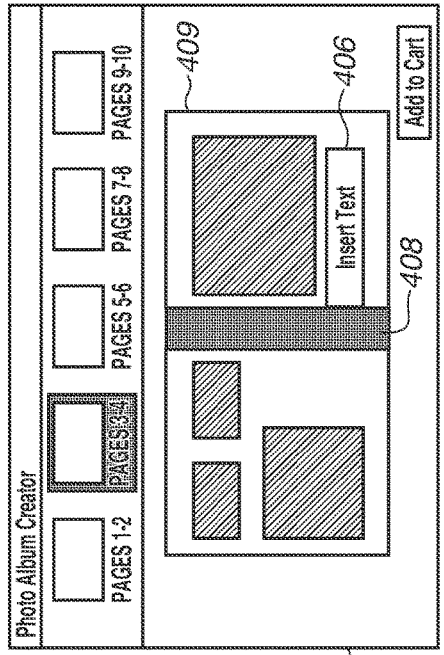

FIGS. 8A to 8D illustrate a screen transition of the layout editing screen according to the present embodiment. FIGS. 8A and 8B illustrate a screen transition of the layout editing screen of a full flat type photo album, in which the text box 406 is moved into the layout-inhibited area 408 and subsequently laid out at a position not overlapping with the layout-inhibited area 408. FIGS. 8C and 8D illustrate a screen transition of the layout editing screen of a standard type photo album, in which the text box 406 is moved into the layout-inhibited area 408 and subsequently laid out at a position not overlapping with the layout-inhibited area 408.

As illustrated in FIGS. 8A to 8D, the full flat type photo album and the standard type photo album differs in size (a lateral width illustrated in FIGS. 8A to 8D) of the layout-inhibited area 408 in the layout editing area 409. As described above with reference to FIGS. 5A to 5I, the full flat type photo album makes it possible to restrain to some extent the swell occurring near the fold of spread pages, and has a low possibility that the fold makes a text hard to be seen when spread pages are opened. However, since printed sheets corresponding to the right and left pages are cut off and the separated printed sheets are glued with adhesive tapes, there is a possibility that a text is separated or shifted to some extent when cutting off or gluing printed sheets. To avoid a text from being separated or shifted in this way, the layout-inhibited area 408 where the text box 406 cannot be laid out is provided.

On the other hand, the layout-inhibited area 408 of a standard type photo album is larger in size (laterally wider) than the layout-inhibited area 408 of a full flat type photo album. This is because, in a standard type photo album, a swell occurs on the fold of spread pages and so a text becomes hard to be seen when it is laid out near the fold of spread pages, as described above with reference to FIGS. 6A and 6B. Thus, even if the number of printed sheets (pages) to be bound is the same, the size (the lateral width illustrated in FIGS. 8A to 8D) of the layout-inhibited area 408 in the layout editing area 409 changes according to the bookbinding pattern.

Since a longitudinal width (illustrated in FIGS. 8A to 8D) of the layout-inhibited area 408 is less affected by the difference in the bookbinding pattern than the lateral width is, the longitudinal width of the layout-inhibited area 408 constantly equals the maximum height in the layout editing area 409. However, the longitudinal width of the layout-inhibited area 408 may be changed depending on various conditions. According to the present embodiment, when the size of the photo album changes, the height of the layout-inhibited area 408 is changed according to the height of the photo album.

According to the present embodiment, even if the size of the photo album changes, it is not necessary to change the width of the layout-inhibited area 408. For example, suppose a case where the size of spread pages in a photo album is A4 and a case where the size thereof is A3. In either case, there is no big difference in the area where an object may possibly be hidden after binding of the printed portion. Accordingly, in either case where the size of spread pages is A4 or A3, the width of the layout-inhibited area 408 may be left unchanged (fixed) as long as the bookbinding pattern is the same.

For example, suppose that the layout-inhibited area 408 of spread pages of the A3 size is twice in size that of spread pages of the A4 size, an area where a layout does not normally need to be inhibited may also be included in the layout-inhibited area 408. Then, the size of the layout-inhibited area 408 may be fixed regardless of the size of spread pages (size of printed sheets). When the size of spread pages is changed from A4 to A3, a similar effect can be obtained also by making a magnification ratio of the size of the layout-inhibited area 408 smaller than the ratio of sizes of spread pages before and after change (twice in the above-described example).

The present embodiment has been described above focusing on an example in which the layout-inhibited area 408 in the layout editing area 409 is determined based on the photo album binding method. In another embodiment, the layout-inhibited area 408 in the layout editing area 409 may be determined based on the number of pages of the photo album. For example, when the standard type binding method is selected, the area in which a text becomes hard to be seen expands with increasing the number of pages of the photo album. Therefore, the size of the layout-inhibited area 408 may be changed according to the number of pages of the photo album.

As illustrated in FIG. 8A, the object moving unit 113 moves the text box 406 to a predetermined position in the layout editing area 409. In a case where the destination position of the text box 406 overlaps with the layout-inhibited area 408, the object layout unit 115 lays out the text box 406 at a position not overlapping with the layout-inhibited area 408, as illustrated in FIG. 8B. According to the present embodiment, in a case where the destination position of the text box 406 overlaps with the layout-inhibited area 408, the object layout unit 115 determines the layout position of the text box 406 based on the position of the horizontal middle point of the text box 406. For example, when the position of the horizontal middle point of the text box 406 is on the right side of the middle point of the layout editing area 409, the object layout unit 115 slides the text box 406 to the right. Likewise, when the position of the horizontal middle point of the text box 406 is on the left side of the middle point of the layout editing area 409, the object layout unit 115 slides the text box 406 to the left. In a case where the text box 406 overlaps with the photo slot 405 as a result of sliding the text box 406, the object layout unit 115 may slide the text box 406 to the opposite side of the photo slot 405. In a case where the text box 406 overlaps with the photo slot 405 as a result of sliding the text box 406 to the right or the left, the object layout unit 115 may return the text box 406 to the position before the movement.

FIGS. 8C and 8D illustrate an example of a screen transition in which the object layout unit 115 lays out the text box 406 at a position not overlapping with the layout-inhibited area 408 in a case where the layout-inhibited area 408 is different in size from that illustrated in FIGS. 8A and 8B.

Figure 9A:
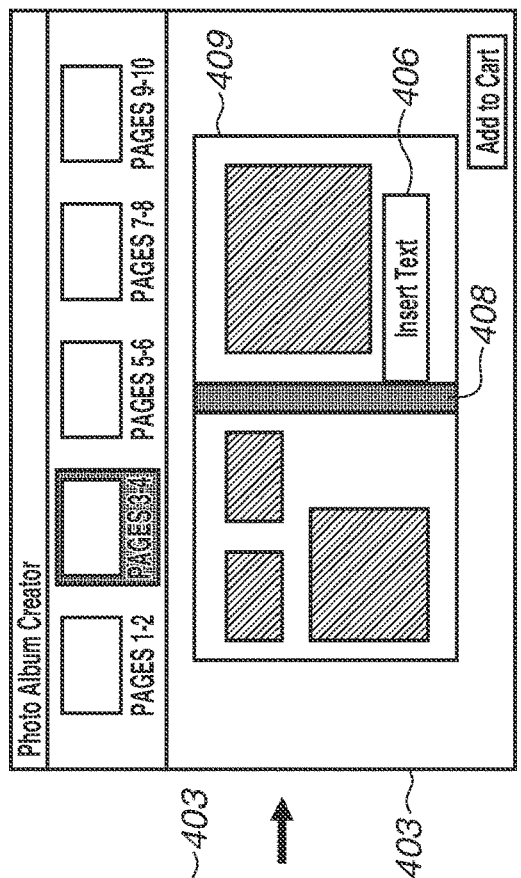
FIGS. 9A and 9B illustrate a screen transition of the layout editing screen according to a modification of the first embodiment.
Figure 9B:
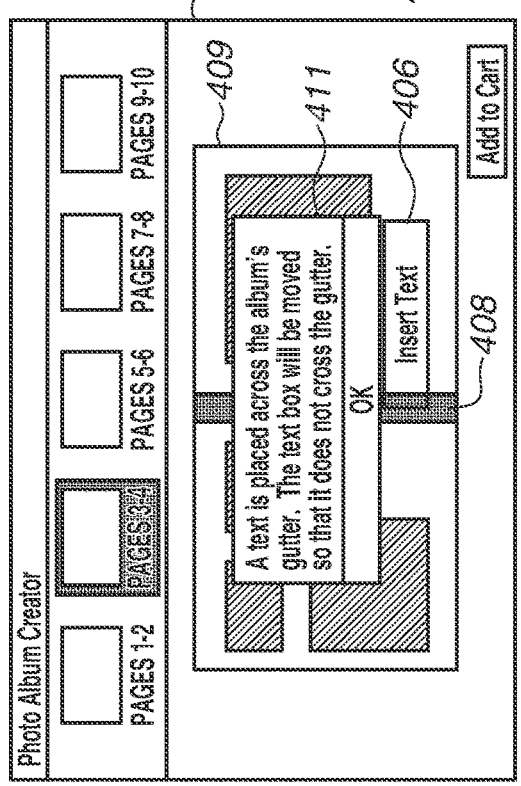

FIGS. 9A and 9B illustrate a modification of the first embodiment. FIGS. 9A and 9B illustrate a screen transition of the layout editing screen of the photo album, in which a warning message 411 is displayed and subsequently the text box 406 is disposed to a position not overlapping with the layout-inhibited area 408. According to the present embodiment, the warning display unit 116 can display the warning message 411 on the display unit 305 when the destination position of the text box 406 overlaps with the layout-inhibited area 408. When an OK button of the warning message 411 illustrated in FIG. 9A is pressed, the object layout unit 115 lays out the text box 406 so as not to overlap with the layout-inhibited area 408.

As described above, the layout editing method according to the present embodiment allows objects to be laid out in the layout editing area 408 in consideration of the binding method and the number of pages of the photo album. This configuration makes it possible to obtain a printout in which photographs and texts are printed at legible positions in spread pages of a book-bound booklet.

According to the first embodiment, when the destination position of the text box 406 is determined to overlap with the layout-inhibited area 408, the object layout unit 115 lays out the text box 406 so as not to overlap with the layout-inhibited area 408. According to a second embodiment, when the text area of the text box 406 is determined to overlap with the layout-inhibited area 408, the object layout unit 115 can lay out the text box 406 so that the text area does not overlap with the layout-inhibited area 408. In this case, the text area of the text box 406 refers to an area where a text input in the text box 406 via an input operation on the input unit 303 is laid out. A text included in such a text box can be said to be an example of an object element.

Figure 10:
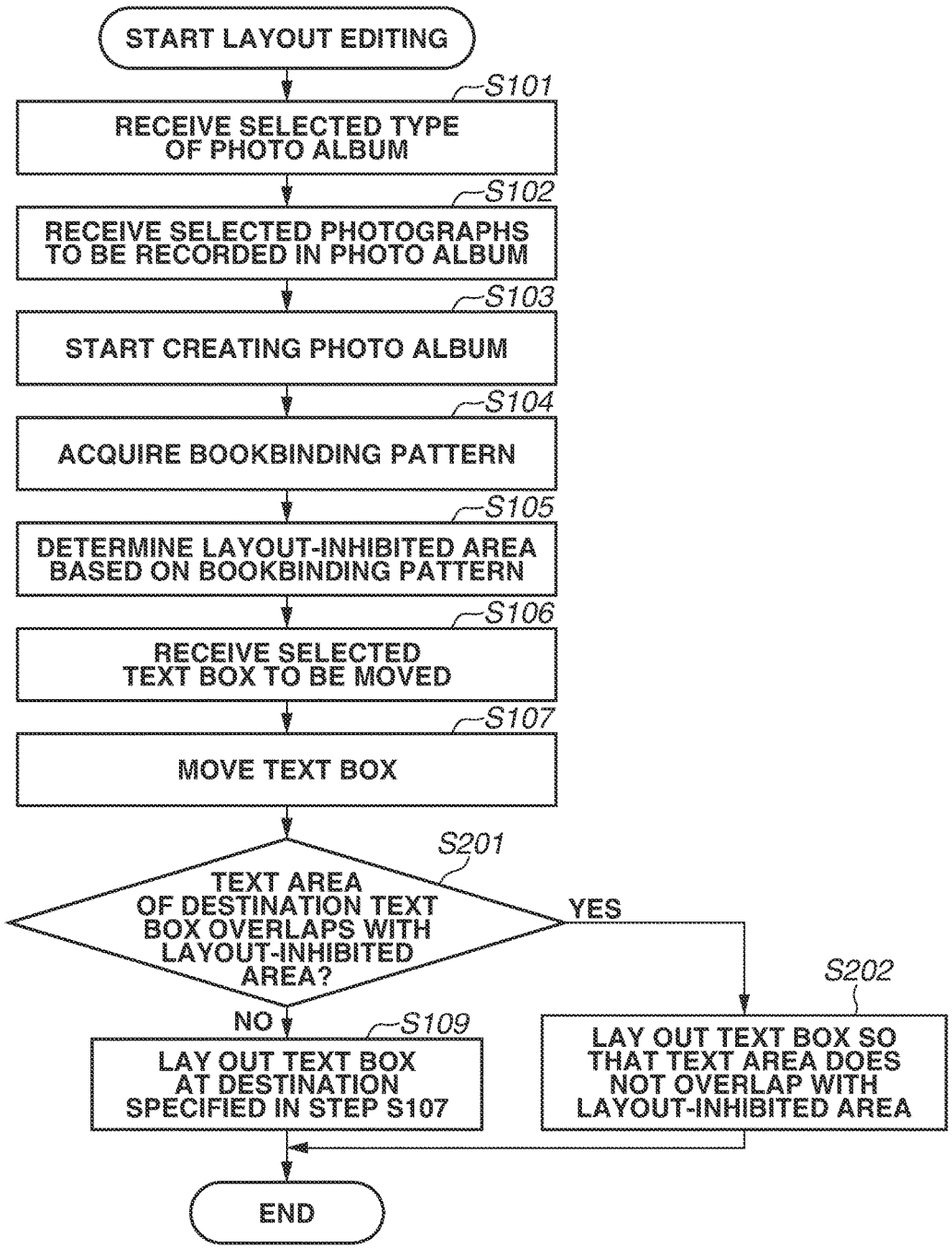
FIG. 10 is a flowchart illustrating the layout editing processing procedure according to a second embodiment.

FIG. 10 is a flowchart illustrating the layout editing processing procedure according to the second embodiment. The processing in the flowchart illustrated in FIG. 10 is implemented when the CPU 304 loads a program code stored in the storage area such as the HDD 302 and then executes the program code. Processing in steps S101 to S107 is similar to the processing illustrated in FIG. 7, and redundant descriptions thereof will be omitted.

In step S201, the overlap determination unit 114 determines whether the text area of the destination text box 406 overlaps with the layout-inhibited area 408. In a case where the overlap determination unit 114 determines that the text area does not overlap with the layout-inhibited area 408 (NO in step S201), the processing proceeds to step S109. In step S109, the object layout unit 115 lays out the text box 406 at the destination specified in step S107. On the other hand, in a case where the overlap determination unit 114 determines that the text area overlaps with the layout-inhibited area 408 (YES in step S201), the processing proceeds to step S202. In step S202, the object layout unit 115 lays out the text box 406 so that the text area does not overlap with the layout-inhibited area 408. A specific method for laying out the text box 406 in step S202 will be described below with reference to FIG. 11 and subsequent drawings.

Figure 11A:
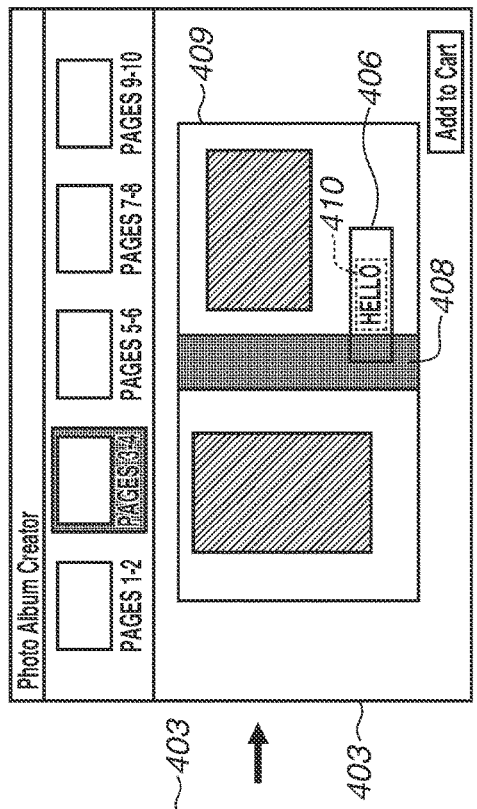
FIGS. 11A, 11B, 11C, and 11D illustrate a screen transition of the layout editing screen according to the second embodiment.
Figure 11B:
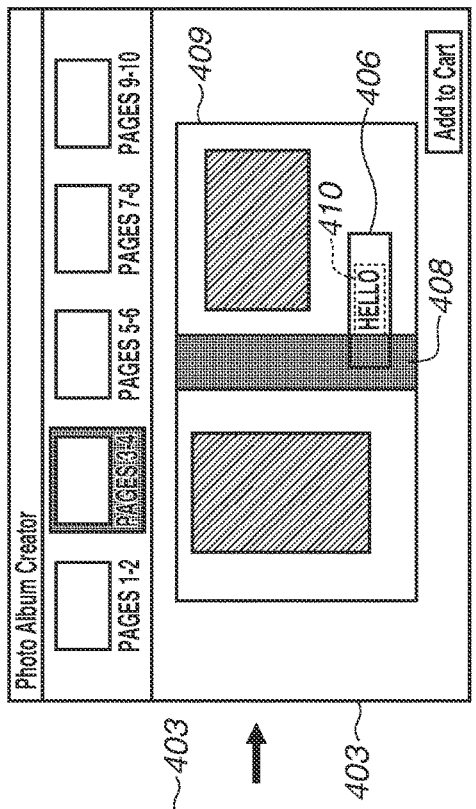
Figure 11C:
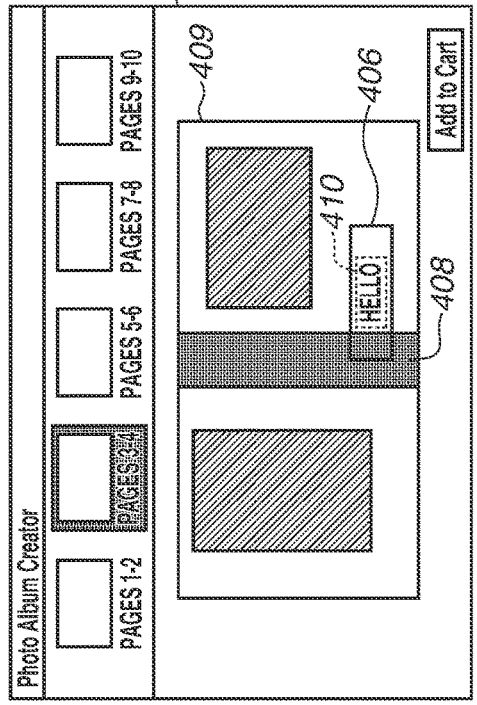
Figure 11D:
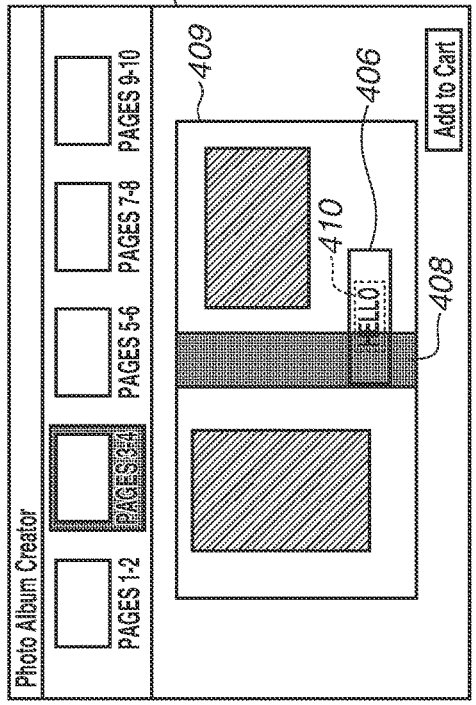

FIGS. 11A to 11D illustrate a screen transition of the layout editing screen according to the present embodiment. FIGS. 11A and 11B illustrate a screen transition of the layout editing screen, in which the text box 406 is moved into the layout-inhibited area 408 and subsequently laid out as it is at the destination position. FIGS. 11C and 11D illustrate a screen transition of the layout editing screen, in which the text box 406 is moved into the layout-inhibited area 408 and subsequently laid out so that a text area 410 does not overlap with the layout-inhibited area 408.

As illustrated in FIG. 11A, the object moving unit 113 moves the text box 406 to a predetermined position in the layout editing area 409. Although the destination position of the text box 406 overlaps with the layout-inhibited area 408, the text area 410 does not overlap with the layout-inhibited area 408. Therefore, as illustrated in FIG. 11B, the object layout unit 115 lays out the text box 406 as it is at the destination position.

On the other hand, as illustrated in FIG. 11C, the object moving unit 113 moves the text box 406 to a predetermined position in the layout editing area 409. At the destination position of the text box 406, the text area 410 overlaps with the layout-inhibited area 408. Therefore, as illustrated in FIG. 11D, the object layout unit 115 lays out the text box 406 so that the text area 410 does not overlap with the layout-inhibited area 408.

Figure 12A:
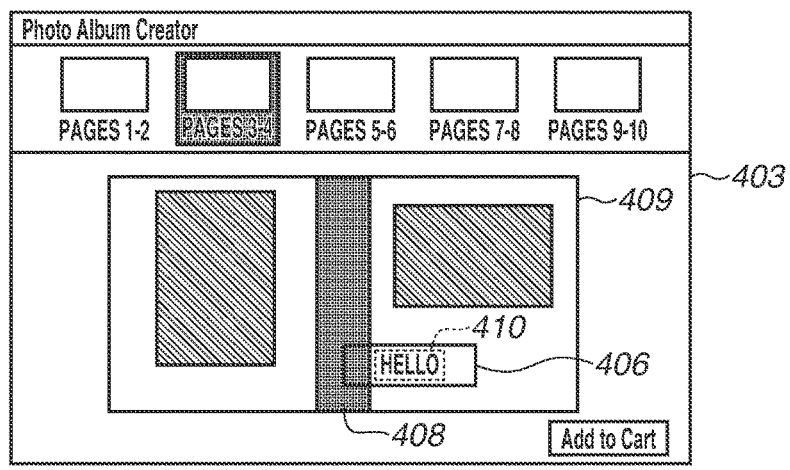
FIGS. 12A, 12B, and 12C illustrate a first modification of the second embodiment.
Figure 12B:
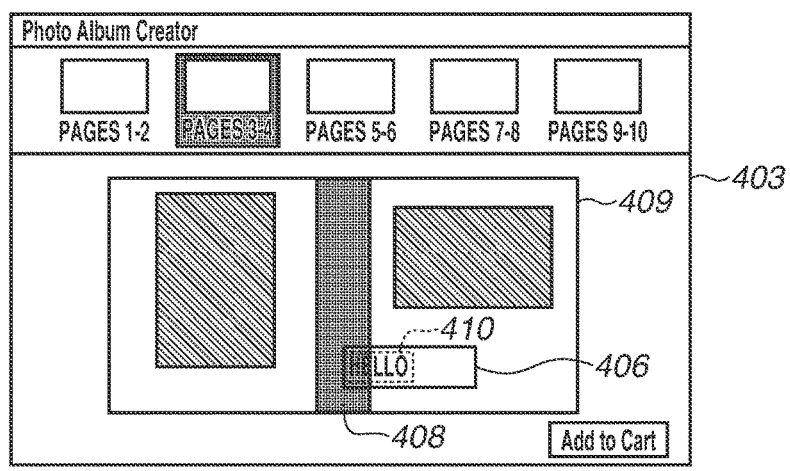
Figure 12C:
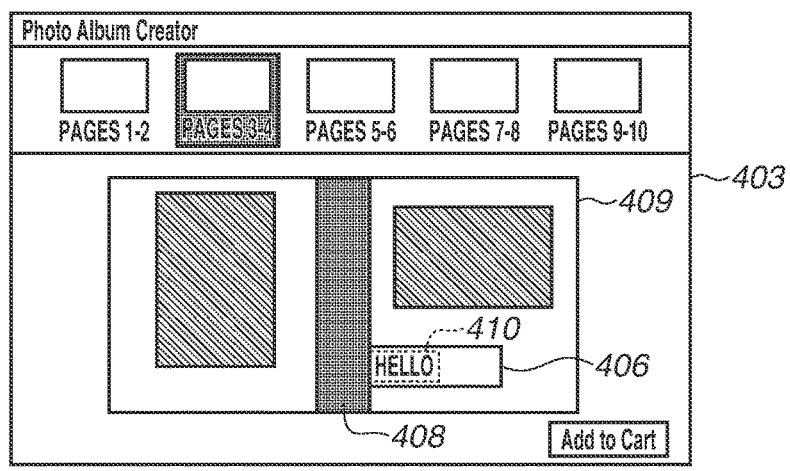

FIGS. 12A to 12C illustrate a first modification of the second embodiment. FIGS. 12A to 12C illustrate an example of a screen transition in which the object layout unit 115 lays out the text box 406 so that the text area 410 does not overlap with the layout-inhibited area 408 as a result of editing a text in the text box 406.

A general layout editing application has a function of laying out the text area 410 in the text box 406 on a left-justified, centering, or right-justified basis. First of all, suppose that the object moving unit 113 moves the text box 406 to a predetermined position in the layout editing area 409, as illustrated in FIG. 12A. In this example, the text area 410 is centered. In this case, since the text area 410 does not overlap with the layout-inhibited area 408, the object layout unit 115 lays out the text box 406 as it is at the destination position. More specifically, not the entire text box 406 but the text area 410 as a part of the text box 406 is processed as an object inhibited to be laid out in the layout-inhibited area 408.

Next, suppose that the application 110 changes the positioning of the text area 410 from centering to left-justification in response to an operation on the input unit 303, as illustrated in FIG. 12B. When the text is left-justified, the text area 410 overlaps with the layout-inhibited area 408. Therefore, the object layout unit 115 lays out the text box 406 so that the text area 410 does not overlap with the layout-inhibited area 408, as illustrated in FIG. 12C.

Although, in the above-described example, the position of the text area 410 is changed, the embodiment is not limited thereto. Even when the text area 410 overlaps with the layout-inhibited area 408 through the use of a text editing function such as changing a text size or a font type, a similar technique to the above-described one is applicable.

FIGS. 13A and 13B illustrate a second modification of the second embodiment. FIGS. 13A and 13B illustrate a screen transition in which the text box 406 is moved into the layout-inhibited area 408 and subsequently, after a space between characters of the text is extended, laid out so that the text area 410 does not overlap with the layout-inhibited area 408.

As illustrated in FIG. 13A, the object moving unit 113 moves the text box 406 to a predetermined position in the layout editing area 409. The destination position of the text box 406 also overlaps with the layout-inhibited area 408, and the text area 410 also overlaps with the layout-inhibited area 408. Therefore, as illustrated in FIG. 13B, the object layout unit 115 lays out the text box 406 so that the text in the text area 410 does not overlap with the layout-inhibited area 408 by extending a space between characters of the text included in the text area 410. More specifically, the text in the text area 410 as a part of the text box 406, not the entire text box 406, is processed as an object inhibited to be laid out in the layout-inhibited area 408.

Although, in the present modification, the object layout unit 115 adjusts the layout of the text in the text box 406, the object layout unit 115 may adjust the layout of an image object such as a photograph and an illustration. Even if the destination position of an image object overlaps with the layout-inhibited area 408, it is not necessary to adjust the layout of the image object as long as an important element of the image object does not overlap with the layout-inhibited area 408. More specifically, the overlap determination unit 114 may determine whether an important element of the image object overlaps with the layout-inhibited area 408.

As described above, in addition to the effect of the first embodiment, the layout editing method according to the present embodiment makes it possible not only to print photographs and texts at legible positions in spread pages of a book-bound booklet but also to obtain a printout meeting the user's intention.

According to the above-described embodiments, the overlap determination unit 114 determines whether the destination position of the text box 406 overlaps with the layout-inhibited area 408. A general layout editing application is able not only to move an object but also to add an object and to change a size of an object. A third embodiment will be described below focusing on a method for determining a maximum value of the text box 406 when adding the text box 406 or changing the size of the text box 406.

FIG. 14 is a schematic view illustrating a maximum width value that can be taken by the text box 406 according to the third embodiment. Suppose that spread pages of a photo album have a length W1 and the layout-inhibited area 408 has a length W2, as illustrated in FIG. 14. In a case where the maximum width value of the text box 406 exceeds (W1−W2)/2, the text box 406 overlaps with the layout-inhibited area 408 after the text box 406 is laid out at any position in the layout editing area 409. Accordingly, the maximum width value of the text box 406 added or changed in size is a half of a value obtained by subtracting the width of the layout-inhibited area 408 from the width of the layout editing area 409.

As described above, in addition to the effects of the above-described embodiments, the layout editing method according to the present embodiment makes it possible to obtain a printout in which photographs and texts are printed at legible positions, without performing complicated processing or operations in an object layout.

Figure 15A:
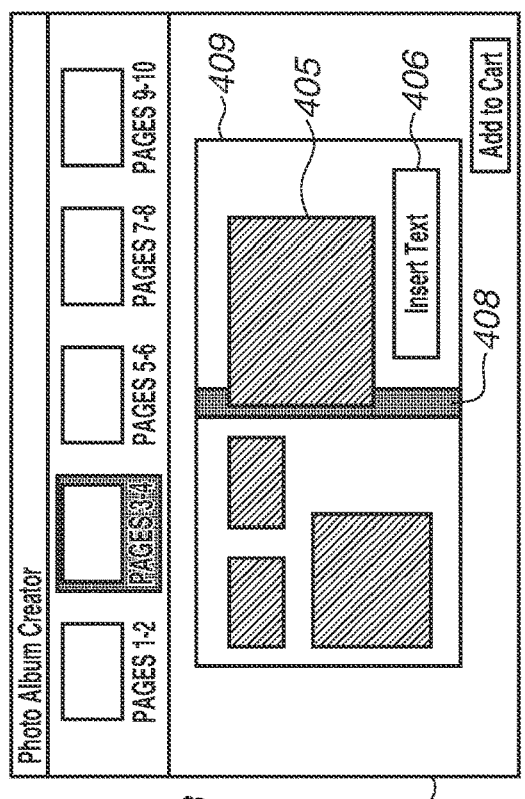
FIGS. 15A and 15B illustrate a screen transition of the layout editing screen according to a fourth embodiment.
Figure 15B:
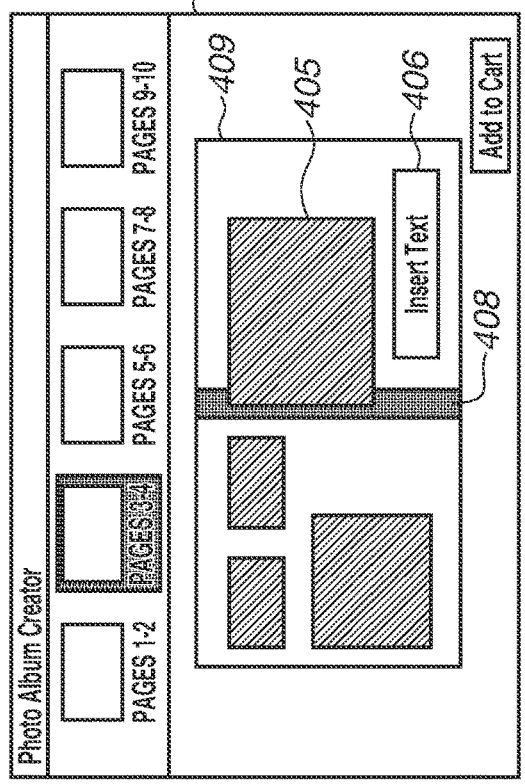

FIGS. 15A and 15B illustrate a screen transition of the layout editing screen according to a fourth embodiment. FIGS. 15A and 15B illustrate a screen transition of the layout editing screen, in which the photo slot 405 is moved into the layout-inhibited area 408 and subsequently laid out as it is at the destination position.

As illustrated in FIG. 15A, the object moving unit 113 moves the photo slot 405 to a predetermined position in the layout editing area 409. Although the destination position of the photo slot 405 overlaps with the layout-inhibited area 408, the object layout unit 115 lays out the photo slot 405 as it is at the destination position, as illustrated in FIG. 15B. Thus, the object layout unit 115 may determine a type of a layout target object and, based on the determination result, determine whether to lay out the object as it is at the destination position.

In the example illustrated in FIGS. 15A and 15B, although the text box 406 is inhibited to be laid to overlap with the layout-inhibited area 408, an image object (photograph or image) is permitted to be laid out to overlap with the layout-inhibited area 408.

As described above, in addition to the effects of the above-described embodiments, the layout editing method according to the present embodiment makes it possible to obtain a printout in which photographs and texts are printed at legible positions in consideration of the characteristics of each of the photographs and the texts.

FIGS. 16A to 16D illustrate an example of the layout editing screen according to a fifth embodiment. According to the present embodiment, the size of the layout-inhibited area 408 is determined in consideration of not only the binding method but also the number of pages of a photo album.

Figure 16A:
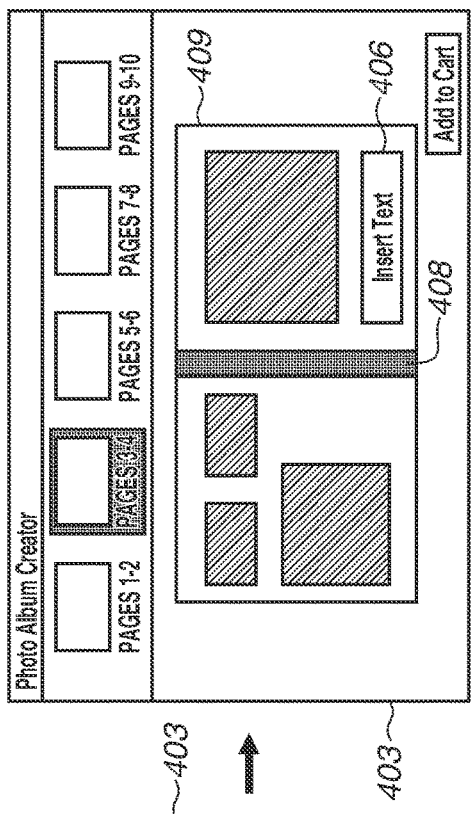
FIGS. 16A, 16B, 16C, and 16D illustrate an example of the layout editing screen according to a fifth embodiment.
Figure 16B:
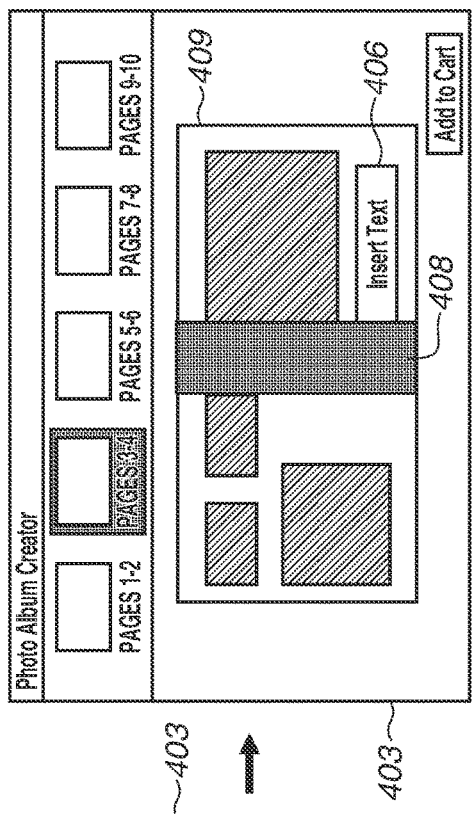

FIG. 16A illustrates the layout editing screen when the number of pages of a full flat type photo album is specified as 20 pages. FIG. 16B illustrates the layout editing screen when the number of pages of a full flat type photo album is specified as 60 pages. When comparison is made between the layout editing screens illustrated in FIGS. 16A and 16B, the layout-inhibited areas 408 are the same in size. As described above with reference to FIGS. 5A to 5I, when the full flat type binding is used, the swell near the fold of spread pages is restrained so that the number of pages does not affect the size of the layout-inhibited area 408.

Figure 16C:
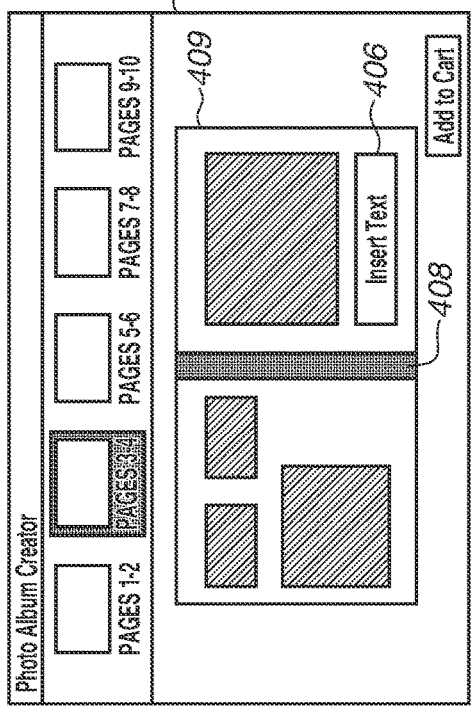
Figure 16D:
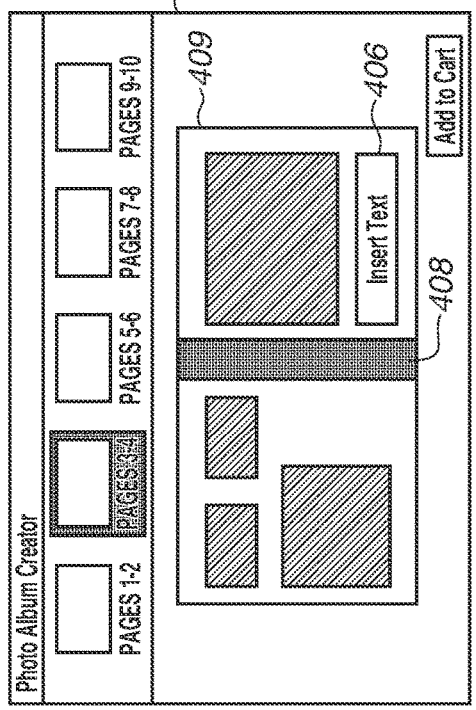

FIG. 16C illustrates the layout editing screen when the number of pages of a standard type photo album is specified as 20 pages. FIG. 16D illustrates a layout editing screen when the number of pages of a standard type photo album is specified as 60 pages. When comparison is made between the layout editing screens illustrated in FIGS. 16C and 16D, the layout-inhibited area 408 illustrated in FIG. 16D having a larger number of pages is larger in size than that illustrated in FIG. 16C. As described above with reference to FIGS. 6A and 6B, when the standard type binding is used, the increase in the number of pages enlarges the swell near the fold of spread pages, thereby leading to an increase in size of the area unsuitable for text printing. More specifically, in a photo album bound with the standard type bookbinding, the size of the layout-inhibited area 408 is affected by the number of pages.

As described above, in addition to the effects of the above-described embodiments, the layout editing method according to the present embodiment makes it possible to obtain a printout in which photographs and texts are printed at legible positions in spread pages of a book-bound booklet regardless of the number of pages of the booklet.

Figure 17A:
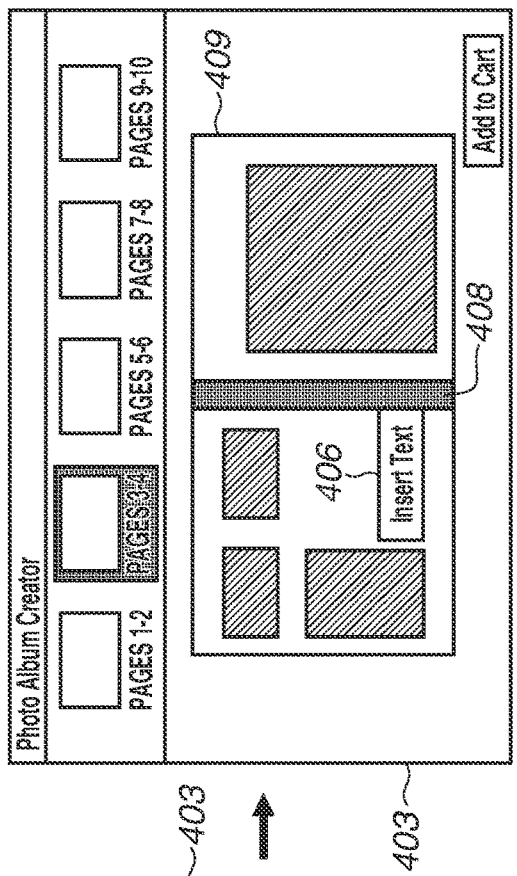
FIGS. 17A and 17B illustrate a screen transition of the layout editing screen according to a sixth embodiment.
Figure 17B:
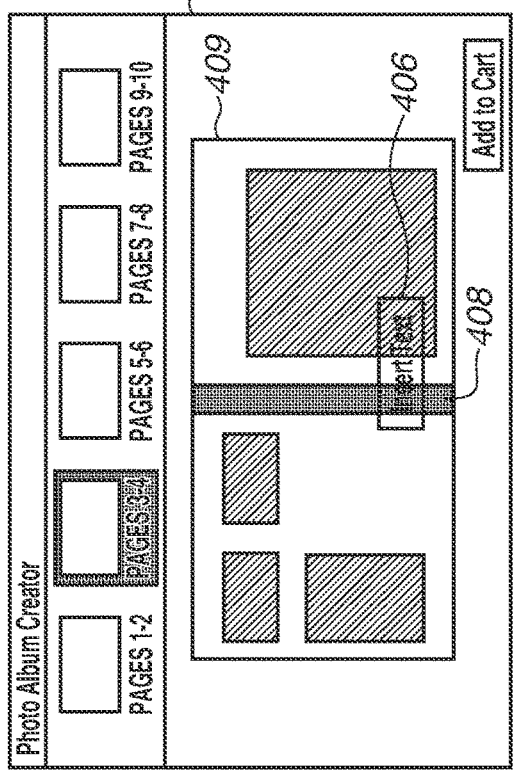

FIGS. 17A and 17B illustrate a screen transition of the layout editing screen according to a sixth embodiment. FIGS. 17A and 17B illustrate a screen transition of the layout editing screen of a photo album, in which the text box 406 is moved into the layout-inhibited area 408 and subsequently laid out at a position not overlapping with the layout-inhibited area 408 or the photo slots 405.

As illustrated in FIG. 17A, the middle point of the text box 406 is positioned on the right-hand side of the layout editing area 409. The object layout unit 115 normally lays out the text box 406 on the right-hand side of the layout editing area 409. However, when the text box 406 is laid out on the right-hand side of the layout editing area 409, the text box 406 overlaps with the photo slot 405. To avoid this, the text box 406 is laid out on the left-hand side of the layout editing area 409, as illustrated in FIG. 17B.

As described above, in addition to the effects of the above-described embodiments, the layout editing method according to the present embodiment makes it possible to print photographs and texts at legible positions in spread pages of a book-bound booklet while preventing the photographs and the texts from overlapping with each other.

Figure 18A:
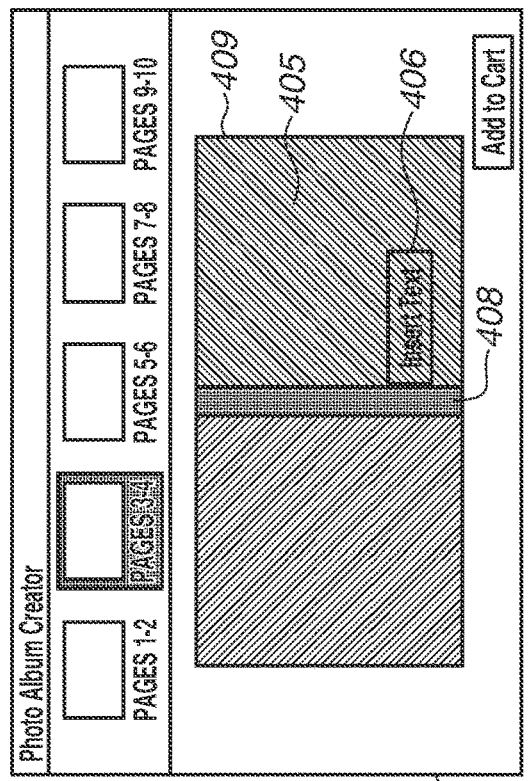
FIGS. 18A and 18B illustrate a screen transition of the layout editing screen according to a seventh embodiment.
Figure 18B:
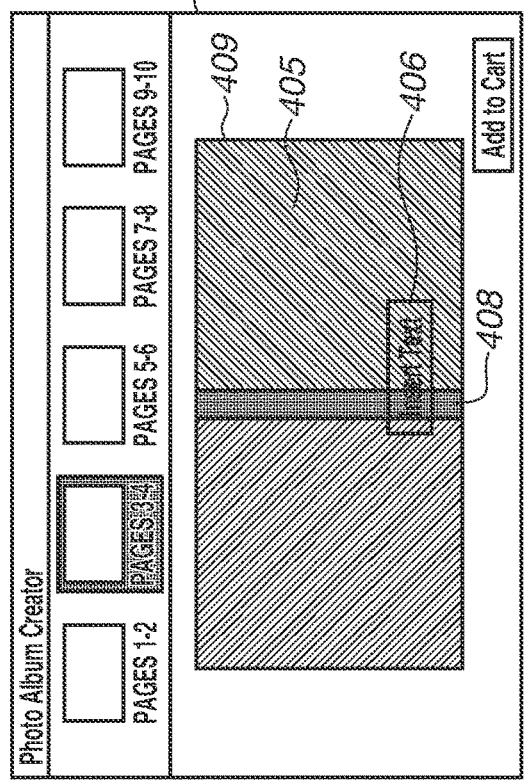

FIGS. 18A and 18B illustrate a screen transition of the layout editing screen according to a seventh embodiment. FIGS. 18A and 8B illustrate a screen transition of the layout editing screen of a photo album, in which the text box 406 is moved into the layout-inhibited area 408 and subsequently laid out at a position not overlapping with the layout-inhibited area 408. In the layout editing screen according to the present embodiment, the photo slot 405 is laid out over the entire surface of the layout editing area 409 of the photo album.

As illustrated in FIGS. 18A and 18B, since the photo slot 405 may be laid out over the entire layout editing area 409 as a background, the object layout unit 115 can lay out the photo slot 405 and the layout-inhibited area 408 so that they overlap with each other. On the other hand, in a case where the destination position of the text box 406 overlaps with the layout-inhibited area 408, the object layout unit 115 lays out the text box 406 at a position not overlapping with the layout-inhibited area 408, as illustrated in FIG. 18B. More specifically, the object layout unit 115 according to the present embodiment determines a type of a layout target object and, according to the determination result, determines whether to lay out the object as it is at the destination position or to lay out the object at a position not overlapping with the layout-inhibited area 408.

Referring to FIGS. 18A and 18B, although the text box 406 is inhibited to be laid out to overlap with the layout-inhibited area 408, an image object (photograph or image) is permitted to be laid out to overlap with the layout-inhibited area 408.

As described above, in addition to the effects of the above-described embodiments, the layout editing method according to the present embodiment makes it possible not only to print photographs and texts at legible positions in spread pages of a book-bound booklet but also to obtain a printout meeting the user's intention.

In the above-described embodiments, bookbinding is performed in the following way: a plurality of spread pages is printed as a plurality of printed sheets, and the printed sheets are folded along the page boundary in spread pages and then bound. However, bookbinding is not limited thereto. For example, a plurality of the printed sheets may be bound at any desired edge (top, bottom, right, or left edge). In this case, according to the above-described embodiments, the layout-inhibited area where an object layout is inhibited can be determined at the position corresponding to the edge based on the size according to information about bookbinding (bookbinding pattern).

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation to encompass all such modifications and equivalent structures and functions.

This application claims the benefit of Japanese Patent Application No. 2016-149938, filed Jul. 29, 2016, which is hereby incorporated by reference herein in its entirety.

What is claimed is:

1. A layout editing apparatus capable of editing a layout of a plurality of sheets in a layout editing area displayed on a display unit in a case where the plurality of sheets is to be book-bound after being printed, the layout editing apparatus comprising:
at least one processor; and
a memory which stores a program that, when executed by the at least one processor, causes the layout editing apparatus to perform operations including:

accepting, from a user, a method for binding a plurality of spread pages, determining, in the layout editing area, a layout-inhibited area where a layout of an object is inhibited, at a position corresponding to a portion at which the plurality of printed sheets is to be bound, with a size according to the accepted method for binding the plurality of spread pages, and laying out the object so as not to overlap with the determined layout-inhibited area, wherein, in a case where accepting includes accepting a first method as the method for binding the plurality of spread pages, determining includes determining the layout-inhibited area with a first size, wherein, in a case where accepting includes accepting a second method as the method for binding the plurality of spread pages, determining includes determining the layout-inhibited area with a second size larger than the first size, wherein the executed program further causes the layout editing apparatus to perform operations including deciding whether the object overlaps with the layout-inhibited area in a case where the object is moved according to a user instruction, and wherein, in a case where the moved object overlaps with the layout-inhibited area, laying out includes laying out the object so as not to overlap with the layout-inhibited area.

2. The layout editing apparatus according to claim 1, wherein the executed program further causes the layout editing apparatus to perform operations including displaying, in a case where the object overlaps with the layout-inhibited area, a warning message indicating that the object cannot be laid out at a position overlapping with the layout-inhibited area.

3. The layout editing apparatus according to claim 1, wherein determining includes determining the layout-inhibited area with a size according to, in addition to the accepted method, at least one of the number of the plurality of spread pages to be bound, a size of the plurality of spread pages, and a type of paper on which the plurality of spread pages is to be printed.

4. The layout editing apparatus according to claim 1, wherein the object is at least one of the following: a text box, an image, and a graphic object.

5. The layout editing apparatus according to claim 4, wherein the layout-inhibited area is an area where a layout of the text box as the object is inhibited and a layout of the image is permitted.

6. The layout editing apparatus according to claim 5, wherein, in a case where the text box or the image moves through a user instruction, laying out includes laying out the text box or the image, wherein, in a case where the text box overlaps with the layout-inhibited area by the move, laying out includes laying out the text box so as not to overlap with the layout-inhibited area, and wherein, in a case where the image overlaps with the layout-inhibited area by the move, laying out includes laying out the image at a position overlapping the layout-inhibited area.

7. The layout editing apparatus according to claim 1, wherein a maximum value of a width of the object is a value corresponding to a half of a value obtained by subtracting a width of the layout-inhibited area from a width of the layout editing area.

8. The layout editing apparatus according to claim 1, wherein laying out includes laying out the text box so that a text included in the text box does not overlap with the layout-inhibited area as the object, and a portion not corresponding to the text in the text box is permitted to overlap with the layout-inhibited area.

9. The layout editing apparatus according to claim 8, wherein, in a case where a portion corresponding to the text included in the text box overlaps with the layout-inhibited area, laying out includes laying out the text box so that the text does not overlap with the layout-inhibited area by extending a space between characters included in the text.

10. The layout editing apparatus according to claim 1, wherein, in a case where the plurality of sheets with a plurality of spread pages printed thereon is to be book-bound at a boundary between a plurality of pages included in each of the plurality of spread pages, the layout editing area is an area corresponding to the plurality of spread pages, and wherein determining includes determining the layout-inhibited area at a position corresponding to the boundary between the plurality of pages included in each of the plurality of spread pages based on a size according to the accepted method for binding the plurality of spread pages.

11. The layout editing apparatus according to claim 10, wherein each of the plurality of sheets with the plurality of spread pages is to be book-bound in a horizontal direction in each of the plurality of spread pages, and wherein a vertical height of the layout-inhibited area constantly is equal in the first size and the second size, and a horizontal width of the first size is different from that of the second size.

12. The layout editing apparatus according to claim 10, wherein the first method for binding the plurality of spread pages corresponds to a flat type photo album which makes it possible to restrain to some extent swell occurring near fold of spread pages, compared with the second method for binding the plurality of spread pages.

13. A method for a layout editing apparatus capable of editing a layout of a plurality of sheets in a layout editing area displayed on a display unit in a case where the plurality of sheets is to be book-bound after being printed, the method comprising:

accepting, from a user, a method for binding a plurality of spread pages;

determining, in the layout editing area, a layout-inhibited area where a layout of an object is inhibited, at a position corresponding to a portion at which the plurality of printed sheets is to be bound, with a size according to the accepted method for binding the plurality of spread pages;

laying out the object so as not to overlap with the determined layout-inhibited area, wherein, in a case where accepting includes accepting a first method as the method for binding the plurality of spread pages, determining includes determining the layout-inhibited area with a first size, and wherein, in a case where accepting includes accepting a second method as the method for binding the plurality of spread pages, determining includes determining the layout-inhibited area with a second size larger than the first size; and deciding whether the object overlaps with the layout-inhibited area in a case where the object is moved according to a user instruction, wherein, in a case where the moved object overlaps with the layout-inhibited area, laying out includes laying out the object so as not to overlap with the layout-inhibited area.

14. The layout editing method according to claim 13, further comprising displaying, in a case where the object overlaps with the layout-inhibited area, a warning message indicating that the object cannot be laid out at a position overlapping with the layout-inhibited area.

15. The layout editing method according to claim 13, wherein determining includes determining the layout-inhibited area with a size according to, in addition to the accepted method, at least one of the number of the plurality of spread pages to be bound, a size of the plurality of spread pages, and a type of paper on which the plurality of spread pages is to be printed.

16. The layout editing method according to claim 13, wherein the object is at least one of the following: a text box, an image, and a graphic object.

17. The layout editing method according to claim 16, wherein the layout-inhibited area is an area where a layout of the text box as the object is inhibited and a layout of the image is permitted.

18. The layout editing method according to claim 17,
wherein, in a case where the text box or the image moves through a user instruction, laying out includes laying out the text box or the image,
wherein, in a case where the text box overlaps with the layout-inhibited area by the move, laying out includes laying out the text box so as not to overlap with the layout-inhibited area, and
wherein, in a case where the image overlaps with the layout-inhibited area by the move, laying out includes laying out the image at a position overlapping the layout-inhibited area.

19. The layout editing method according to claim 13, wherein a maximum value of a width of the object is a value corresponding to a half of a value obtained by subtracting a width of the layout-inhibited area from a width of the layout editing area.

20. A non-transitory computer-readable storage medium storing a program to cause a layout editing apparatus to perform a method, wherein the layout editing apparatus is capable of editing a layout of a plurality of sheets in a layout editing area displayed on a display unit in a case where the plurality of sheets is to be book-bound after being printed, the method comprising:
accepting, from a user, a method for binding a plurality of spread pages;
determining, in the layout editing area, a layout-inhibited area where a layout of an object is inhibited, at a position corresponding to a portion at which the plurality of printed sheets is to be bound, with a size according to the accepted method for binding the plurality of spread pages;
laying out the object so as not to overlap with the determined layout-inhibited area,
wherein, in a case where accepting includes accepting a first method as the method for binding the plurality of spread pages, determining includes determining the layout-inhibited area with a first size, and
wherein, in a case where accepting includes accepting a second method as the method for binding the plurality of spread pages, determining includes determining the layout-inhibited area with a second size larger than the first size; and
deciding whether the object overlaps with the layout-inhibited area in a case where the object is moved according to a user instruction, and
wherein, in a case where the moved object overlaps with the layout-inhibited area, laying out includes laying out the object so as not to overlap with the layout-inhibited area.

* * * * *